United States Patent [19]

Couture et al.

[11] Patent Number: 5,438,228

[45] Date of Patent: * Aug. 1, 1995

[54] ELECTRICALLY MOTORIZED WHEEL ASSEMBLY

[75] Inventors: Piére Couture, Boucherville; Bruno Francoeur, Loretteville; Julien Simard, Brossard; Francois-Xavier Bourgeois, St-Liboire; Germain Harbec, Ste-Julie, all of Canada

[73] Assignee: Hydro-Quebec, Montreal, Canada

[*] Notice: The portion of the term of this patent subsequent to Jul. 5, 2011 has been disclaimed.

[21] Appl. No.: 151,192

[22] Filed: Nov. 12, 1993

Related U.S. Application Data

[63] Continuation of Ser. No. 77,646, Jul. 23, 1993, Pat. No. 5,355,039, which is a continuation of Ser. No. 913,021, Jul. 14, 1992.

[51] Int. Cl.⁶ .................. H02K 11/00; H02K 7/14; H02K 7/10
[52] U.S. Cl. .................. 310/67 R; 310/68 R
[58] Field of Search .............. 310/67 R, 90, 68 B, 310/68 R, 217, 218; 318/138; 180/65.5, 65.6, 242

[56] References Cited

U.S. PATENT DOCUMENTS

| | | | |
|---|---|---|---|
| 638,643 | 12/1899 | Newman et al. | 310/67 R |
| 643,854 | 2/1900 | Whittlesey | 310/67 R |
| 754,802 | 3/1904 | Porsche et al. | 180/65.5 |
| 789,454 | 5/1905 | Reist | 310/217 |
| 802,632 | 10/1905 | Gill | 310/67 R |
| 887,521 | 5/1908 | Reist | 310/218 |
| 1,270,421 | 6/1918 | Kingsbury | 310/67 R |
| 1,709,255 | 4/1929 | Fielder | 180/24.07 |
| 1,997,974 | 4/1935 | Moore et al. | 310/67 R |
| 2,335,398 | 11/1943 | Downey | 172/287 |
| 2,348,053 | 5/1944 | Bowker | 171/313 |
| 2,506,146 | 5/1950 | Gladish | 172/287 |
| 2,514,460 | 7/1950 | Tucker | 172/287 |
| 2,581,551 | 1/1952 | Myrmirides | 172/287 |
| 2,608,598 | 8/1952 | Hawkins et al. | 172/36 |
| 3,548,965 | 12/1970 | Pierro | 180/65 |
| 3,566,165 | 2/1971 | Lohr | 310/67 |
| 3,581,173 | 5/1971 | Hood | 318/254 |
| 3,704,759 | 12/1972 | Vitkov et al. | 180/65 F |
| 3,792,742 | 2/1974 | Mager | 180/65 F |
| 3,812,928 | 5/1974 | Rockwell et al. | 180/65 F |
| 3,892,300 | 7/1975 | Hapeman et al. | 192/2 |
| 3,897,843 | 8/1975 | Hapeman et al. | 180/65 F |
| 4,021,690 | 5/1977 | Burton | 310/67 R |
| 4,223,255 | 9/1980 | Goldman et al. | 318/138 |
| 4,346,777 | 8/1982 | Restelli | 180/220 |
| 4,389,586 | 6/1983 | Foster et al. | 310/67 R |
| 4,471,250 | 9/1984 | Snider | 310/67 R |
| 4,546,422 | 10/1985 | Okado | 363/41 |
| 4,763,981 | 8/1988 | Wilkins | 350/96.23 |
| 4,913,258 | 4/1990 | Sakurai et al. | 180/242 |
| 4,918,365 | 4/1990 | Tanuma et al. | 318/685 |
| 4,952,012 | 9/1990 | Stamnitz | 350/96.23 |
| 5,049,769 | 9/1991 | Reinhardt et al. | 310/67 R |
| 5,164,623 | 11/1992 | Shkondin | 310/67 R |
| 5,327,034 | 7/1994 | Couture et al. | 310/67 R |

FOREIGN PATENT DOCUMENTS

| | | |
|---|---|---|
| 0492290 | 7/1992 | European Pat. Off. . |
| 3716871 | 12/1988 | Germany . |
| 61-233707 | 4/1960 | Japan . |
| 0070628 | 3/1991 | Japan . |
| 1592192 | 7/1981 | United Kingdom . |

OTHER PUBLICATIONS

Feucht et al., "Brushless Motor Space Optimization with Drive Electronics Contained in the Motor", SAE Technical Paper Series, Aug. 1987, pp. 1-5.

Primary Examiner—Clayton E. LaBalle
Attorney, Agent, or Firm—Foley & Lardner

[57] ABSTRACT

The electrically motorized wheel assembly comprises a hollow shaft having a first opening at one end thereof and a second opening, the first opening receiving conductors from outside of the assembly; a stator coaxial with and fixedly attached to the shaft, the stator being provided with a hollow portion and coils; a rotor coaxial with the stator and mounted for rotation about the stator; and converting system for converting an input electrical current to a variable AC electrical current, the converting system including power electronics fixedly mounted within the hollow portion, input terminals for receiving the input electrical current and output terminals for delivering the variable AC electrical current; whereby, to provide the variable AC current to the coils of the stator.

20 Claims, 18 Drawing Sheets

ELECTRICALLY MOTORIZED WHEEL ASSEMBLY

This application is a continuation of application Ser. No. 08/077,646, now U.S. Pat. No. 5,355,039, filed Jul. 23, 1993 which is a continuation of Ser. No. 07/913,021 filed on Jul. 14, 1992.

FIELD OF THE INVENTION

The present invention is concerned with an electrically motorized wheel assembly.

BACKGROUND OF THE INVENTION

Known in the art, there is the U.S. Pat. No. 4,913,258 of Hiroshi SAKURAI et al, granted on Apr. 3, 1990, in which there is described an outer-rotor type motor wheel, comprising a knuckle, a hub coaxially interlocked with the knuckle, a wheel disc rotatably attached to the periphery of the hub, a wheel secured to the periphery of the wheel disc, a rotor fastened to an outer side of the wheel disc from the direction of the outer side, and a stator coaxial to and spaced from the rotor by a small gap and fastened to the hub from the direction of the outer side. One drawback with this outer-rotor type motor wheel, is that in order to provide a powerful motor wheel having a high torque, high current has to be injected to the power line to energize the coil of the armature core even at zero speed. With this outer-rotor type motor wheel, a converter has to be provided. This converter is mounted inside the vehicle and can be very cumbersome. Such high current circulating through the power line produces heat which is energy loss and also requires a power line which can be quite heavy.

Also known in the art, there is the U.S. Pat. No. 754,802 of Ferdinand PORSCHE et al, granted on Mar. 15, 1904, in which there is described the combination of the axle, the wheel, the hollow journal for the wheel, the end of the axle projecting to the journal, and a pivotal connection between the axle and journal having its axial line disposed acutely to the plane of the wheel. Again, to produce a powerful motor-wheel, the current supplied to the sliding brushes, brought from outside of the motor-wheel has to be a high current. This high current will have to be brought through large diameter cables or wires to reduce energy loss.

Also known in the art, there is the U.S. Pat. No. 2,348,053 of J. E. BOWKER, granted on May 2, 1944, in which there is described an electrically-operated motor vehicle improvements comprising a plurality of wheels arranged to be driven, a dynamotor forming an integral part of each such wheel, and electrical circuit connections between switch banks and dynamotors and batteries to control the operation of the dynamotors as motors according to the position of a selector switch. Again, the armature windings will have to be energized with a high current in order to produce a powerful motor, such high current will require large diameter cables to bring the energy from the batteries of the vehicle to the windings of the armature. As well known, such large diameter cables or wires are rigid, cumbersome and incovenient.

Also known in the art, there are the following U.S. patents that describe different kinds of motor-wheels U.S. Pat. Nos. 638,643; 643,854; 2,506,146; 2,514,460; 2,581,551; 2,608,598; 3,566,165; 3,704,759; 3,792,742; 3,812,928; 3,892,300; 3,897,843; 4,021,690; 4,346,777; 4,389,586; 1,709,255; 2,335,398; 3,549,965.

None of the above-mentioned patents shows the necessary means for reducing the diameter of the wires of the power line between the motorized wheel assembly and the power supply when a powerful motorized wheel assembly is needed.

It is an object of the present invention to provide an electrically motorized wheel assembly wherein a variable AC current can be provided to coils of the stator of the assembly, and wherein relatively small diameter flexible and less cumbersome wires or cables can be used to supply electrical energy to the assembly even when a powerful motorized wheel assembly is needed.

It is also a further object obtained by a preferred embodiment of the present invention to provide a motorized wheel assembly having a ratio $R_1/R_2$ as close as possible to 1 where $R_1$ is the distance between the air gap of the motorized assembly and the axis of rotation of the assembly, and $R_2$ is the distance between the surface of a rim fixed onto the assembly, adapted to receive a tire, and the axis of rotation of the assembly.

It is also a further object of the present invention to provide a motorized wheel assembly that reduces heat production and energy loss.

It is also a further object of the present invention obtained by a preferred embodiment of the present invention to provide a motorized wheel assembly that is provided with means for cooling down the assembly when it is operating.

It is a further object obtained by a preferred embodiment of the present invention to provide a motorized wheel assembly having a reduced weight while being compatible with standard braking system, suspension system and steering system.

It is a further object obtained by a preferred embodiment of the present invention to provide a motorized wheel assembly which is detachable from a suspension arm.

SUMMARY OF THE INVENTION

According to the present invention, there is provided an electrically motorized wheel assembly, comprising:

a hollow shaft having a first opening at one end thereof and a second opening, said first opening receiving conductors from outside of said assembly;

a stator coaxial with and fixedly attached to said shaft, said stator being provided with a hollow portion and coils;

a rotor coaxial with said stator and mounted for rotation about said stator;

converting means for converting an input electrical current to a variable AC electrical current, said converting means including power electronics fixedly mounted within said hollow portion, input terminals for receiving said input electrical current and output terminals for delivering said variable AC electrical current;

whereby, to provide said variable AC current to said coils of said stator.

Also, according to the present invention there is also provided:

a motorized wheel assembly, comprising:

a hollow shaft having a first opening at one end thereof and a second opening, said first opening being for receiving conductors from outside of said assembly;

a stator having a central portion adapted to receive and be attached to said shaft, a support extending radially from said central portion, a peripheral circular pole piece comprising metallic strips wound with coils, and a hollow portion, said pole piece being fixed onto peripheral ends of said support, said support being provided with openings to reduce its weight;

a rotor including a housing having a cylindrical wall having an inner surface provided with a magnetic means surrounding said stator and separated therefrom by an air-gap, said housing also comprising inner and outer walls mounted on both sides of said cylindrical wall, said second opening of said shaft being open into said housing;

two bearing respectively associated with said walls, and respectively mounted on both sides of said shaft so that said rotor can be rotated with respect to said stator; and electrical converting means for converting an input electrical current to a variable AC electrical current, said converting means including power electronics fixedly mounted within said hollow portion, input terminals for receiving said input electrical current, an output terminals for delivering said variable AC electrical current, whereby, to provide said variable AC current to said coils of said stator;

an assembly wherein said magnetic means of said rotor is made of a series of permanent magnets; said assembly further comprising a rim fixed onto said housing in a manner to extend around said cylindrical wall of said housing, and a layer made of elastomer and mounted between said rim and cylindrical wall, said rim being adapted to receive a tire;

an assembly wherein said converting means comprises:

a DC/AC converter having an input for receiving a direct current from said input terminals, and three outputs for generating three phase AC currents into said output terminals; and a microprocessor unit connected to said converter for controlling its operation; an assembly wherein:

said stator is cross-shaped and has four arms;

said converter is made of three converter units that generate respectively said three phase AC currents, said units being fixed respectively onto three of said four arms; and said microprocessor unit is fixed onto the fourth of said arms; said assembly further comprising two circular supply bus connected to said converter and microprocessor units, whereby said direct current can be distributed to said converter and microprocessor units by means of said bus;

an assembly wherein said shaft has its first end provided with a connecting means by which said assembly can be connected to a supporting member;

an assembly wherein said connecting means is made of an annular member having an outer edge regularly provided with recesses alternating with projections so that said annular member can be engaged and locked with a complementary part of the corresponding supporting member; an assembly in combination with said supporting member which is a knuckle-jointed connecting rod, wherein:

said projections of said outer edge have width that varies in the circumferential direction, said complementary part of said knuckle-jointed connecting rod has an annular section having a sufficient diameter so that said annular section can be slid over said outer edge, said annular section has recesses and projections adapted to cooperate with the corresponding projections and recesses of said outer edge, said projections of said annular section having width that varies in the circumferential direction so that said annular section can be slid over said outer edge and rotated with respect with said outer edge to be wedged in an assembled position; said assembly in combination with said supporting member further comprising a key member having tongues that can be inserted in cavities that are produced when said annular section is rotated with respect to said outer edge to lock said outer edge with respect to said annular member; an assembly wherein said air-gap is positioned at a predetermined distance $R_1$ from the central axis of said shaft, said rim has a surface for receiving a tire that is positioned at a predetermined distance $R_2$ from the central axis of said shaft, and $R_1/R_2$ is substantially between 0.65 and 0.91.

Also, according to the present invention, there is also provided:

a motorized wheel assembly, comprising:

a hollow shaft having a first opening at one end thereof and a second opening, said first opening being for receiving conductors from outside of said assembly;

a stator having a central portion adapted to receive and be attached to said shaft, a support extending radially from said central portion, a peripheral circular pole piece comprising metallic strips wound with coils, and a hollow portion, said pole piece being fixed onto peripheral ends of said support, said support being provided with openings to reduce its weight;

a rotor including a housing having a cylindrical wall having an inner surface provided with a magnetic means surrounding said stator and separated therefrom by an airgap, said housing also comprising inner and outer walls mounted on both sides of said cylindrical wall, said second opening of said shaft being open into said housing;

two bearings respectively associated with said walls, and respectively mounted on both sides of said shaft so that said rotor can be rotated with respect to said stator; and electrical converting means for converting an input electrical current to a variable AC electrical current, said converting means including power electronics fixedly mounted within said hollow portion input terminals for receiving said input electrical current, an output terminals for delivering said variable AC electrical current, whereby, to provide said variable AC current to said coils of said stator;

an assembly wherein said magnetic means of said rotor is a pole piece made of metallic strips wound with a coil, said stator is provided with brushes that are connected to an output of said converting means, and said rotor is provided with conductive contact surfaces disposed in a manner to cooperate with said brushes, said contact surfaces being connected to the coil of said rotor;

an assembly wherein said stator is cross-shaped and has four arms;

said assembly further comprising a rim fixed onto said housing in a manner to extend around said cylindrical wall of said housing, and a layer made of elastomer and mounted between said rim and cylindrical wall, said rim being adapted to receive a tire;

an assembly wherein said converting means comprises:

a DC/AC converter having an input for receiving a direct current from said input terminals, and four outputs for generating respectively a DC current for said coil of said rotor, and three phase AC currents for said coils of said stator;

a microprocessor unit connected to said converter for controlling its operation;

an assembly wherein said converter comprises a first converter unit that generates said DC current for said coil of said rotor, and three converter units that generates respectively said three phase AC currents;

an assembly wherein said shaft has its first end provided with a connecting means by which said assembly can be connected to a supporting member;

an assembly wherein said connecting means is made of an annular member having an outer edge regularly provided with recesses alternating with projections so that said annular member can be engaged and locked with a complementary part of the corresponding supporting member;

an assembly in combination with said supporting member which is a knuckle-jointed connecting rod, wherein:

said projections of said outer edge have width that varies in the circumferential direction, said complementary part of said knuckle-jointed connecting rod has an annular section having a sufficient diameter so that said annular section can be slid over said outer edge, said annular section has recesses and projections adapted to cooperate with the corresponding projections and recesses of said outer edge, said projections of said annular section having width that varies in the circumferential direction so that said annular section can be slid over said outer edge and rotated with respect with said outer edge to be wedged in an assembled position;

said assembly in combination with said supporting member further comprising a key member having tongues that can be inserted in cavities that are produced when said annular section is rotated with respect to said outer edge to lock said outer edge with respect to said annular member;

an assembly wherein said air-gap is positioned at a predetermined distance $R_1$ from the central axis of said shaft, said rim has a surface for receiving a tire that is positioned at a predetermined distance $R_2$ from the central axis of said shaft, and $R_1/R_2$ is substantially between 0.85 and 0.80.

Also, according to the present invention, there is provided:

a motorized wheel assembly, comprising:

a hollow shaft having a first opening at one end thereof and a second opening, said first opening being for receiving conductors from outside of said assembly;

a stator having a central portion adapted to receive and be attached to said shaft, a support extending radially from said central portion, a peripheral circular pole piece comprising metallic strips wound with coils, and a hollow portion, said pole piece being fixed onto peripheral ends of said support, said support being provided with openings to reduce its weight;

a rotor including a housing having a cylindrical peripheral wall having an inner surface provided with a magnetic means surrounding said stator and separated therefrom by an air-gap, said housing also comprising inner and outer walls mounted on both sides of said cylindrical peripheral wall, said second opening of said shaft being open into said housing;

two bearings respectively associated with said walls, and respectively mounted on both sides of said shaft so that said rotor can be rotated with respect to said stator; and electrical converting means for converting an input electrical current to a variable AC electrical current, said converting means including power electronics fixedly mounted within said hollow portion, input terminals for receiving said input electrical current, an output terminals for delivering said variable AC electrical current, whereby, to provide said variable AC current to said coils of said stator;

an assembly wherein said magnetic means of said rotor is a pole piece made of metallic strips wound with a coil, whereby electrical current can be induced in said coil of said rotor by means of an electromagnetic field produced by electrical current injected into said coils of said stator; said assembly further comprising a rim fixed onto said housing in a manner to extend around said cylindrical wall of said housing, and a layer made of elastomer and mounted between said rim and cylindrical wall, said rim being adapted to receive a tire;

an assembly wherein said converting means comprises:

a DC/AC converter having an input for receiving a direct current from said input terminals, and three outputs for generating three phase AC currents into said output terminals; and a microprocessor unit connected to said converter for controlling its operation; an assembly wherein:

said stator is cross-shaped and has four arms;

said converter is made of three converter units that generate respectively said three phase AC currents, said units being fixed respectively onto three of said four arms; and said microprocessor unit is fixed onto the fourth of said arms;

said assembly further comprising two circular supply distribution bus connected to said converter and microprocessor units, whereby said direct current can be distributed to said converter and microprocessor units by means of said bus;

an assembly wherein said shaft has its first end provided with a connecting means by which said assembly can be connected to a supporting member;

an assembly wherein said connecting means is made of an annular member having its outer edge regularly provided with recesses alternating with projections so that said annular member can be engaged and locked with a complementary part of the corresponding supporting member;

an assembly in combination with said supporting member which is a knuckle-jointed connecting rod, wherein:

said projections of said outer edge have width that varies in the circumferential direction, said complementary part of said knuckle-jointed connecting rod has an annular section having a sufficient diameter so that said annular section can be slid over said outer edge, said annular section has recesses and projections adapted to cooperate with the corresponding projections and recesses of said outer edge, said projections of said annular section having width that varies in the circumferential direction so that said annular section can be slid over said outer edge and rotated with respect with said outer edge to be wedged in an assembled position; said assembly in combination with said supporting member further comprising a key member having tongues that can be inserted in cavities that are produced when said annular section is rotated with respect to said outer edge to lock said outer edge with respect to said annular member;

an assembly wherein said air-gap is positioned at a predetermined distance $R_1$ from the central axis of said shaft, said rim has a surface for receiving a tire that is positioned at a predetermined distance $R_2$ from the central axis of said shaft, and $R_1/R_2$ is substantially between 0.65 and 0.80.

Further objects, advantages and other features of the present invention will become more apparent upon reading of the following non-restrictive description of preferred embodiments thereof given for the purpose of exemplification only with reference to the accompanying drawings.

DETAILED DESCRIPTION OF THE DRAWINGS

Figure 1:
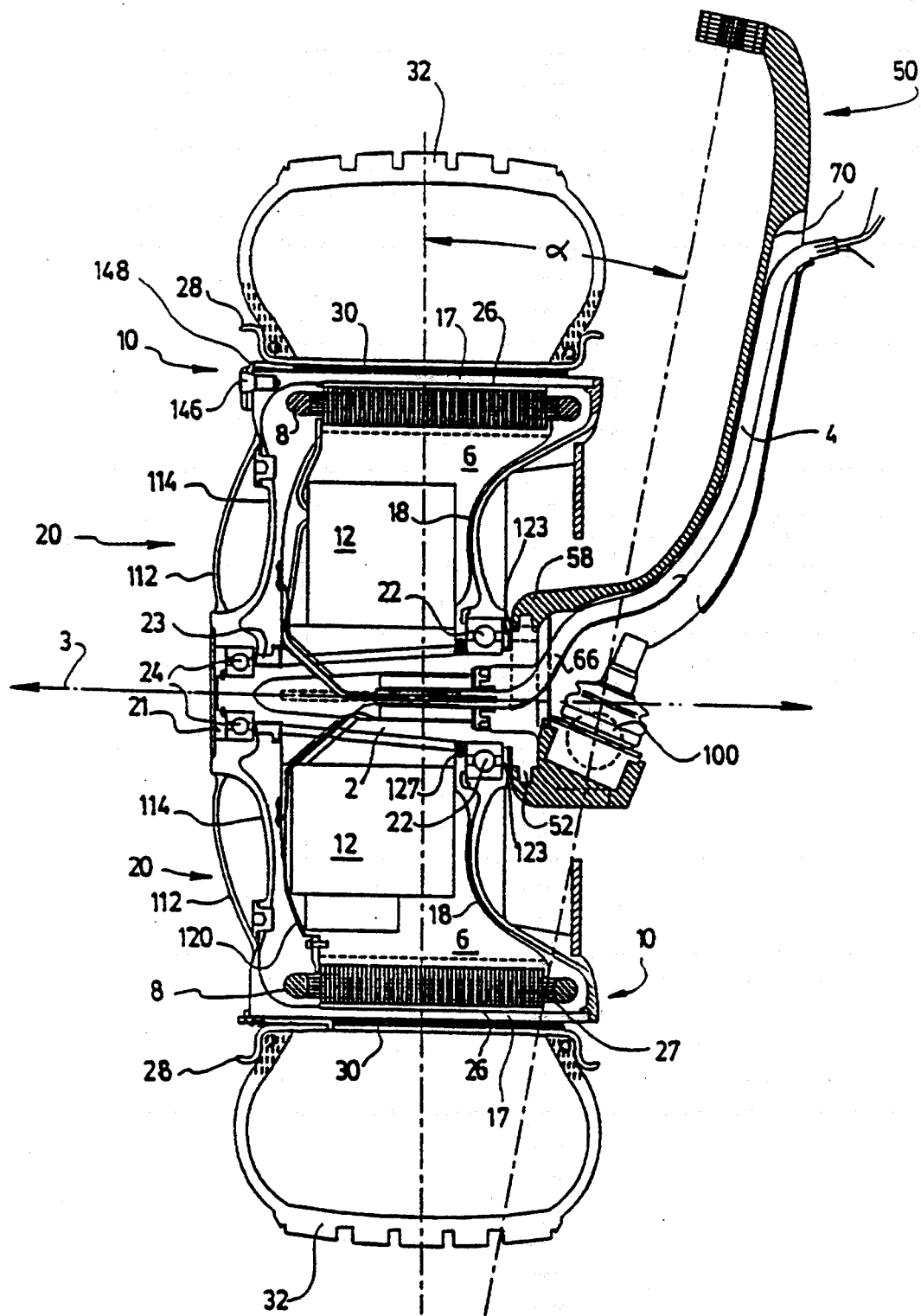
FIG. 1 is a side elevational view partially in cross-section of an embodiment of the present motorized wheel assembly, in combination with a rim, a tire and a knuckle-jointed connecting rod.
Figure 2:
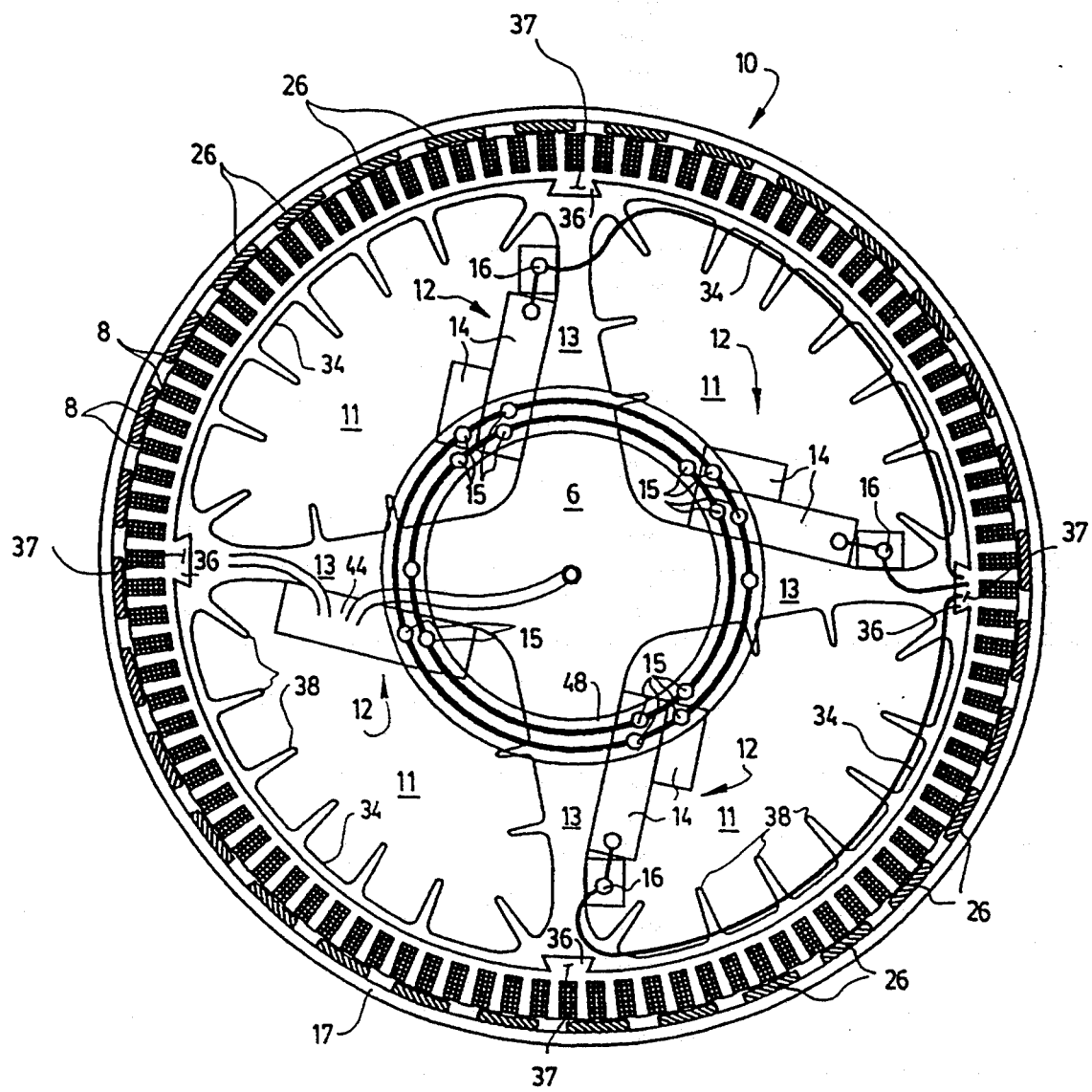
FIG. 2 is a front view partially in cross-section of the rotor and stator of the motorized wheel assembly shown in FIG. 1, details of central core note included.

Referring now to FIGS. 1 and 2, there is shown respectively a side elevational view partially in cross-section of an embodiment of the motorized wheel assembly, in combination with a rim 28, a tire 32 and a knuckle-jointed connecting rod 50; and a front view partially in cross-section of the rotor 10 and stator 6 of the motorized wheel assembly shown in FIG. 1. The electrically motorized wheel assembly comprises a hollow shaft 2 having a first opening at one end thereof and second openings. The first opening receives conductors 4 from outside of the assembly. The stator 6 is coaxial with and fixedly attached to the shaft 2, the stator 6 being provided with hollow portions 11 and coils 8. In FIG. 2, only a few coil sections are indicated by number 8 but it is meant to indicate the coils all around the stator 6. The stator 6 is fixedly attached to the shaft 2 but it can be removed therefrom when the assembly is not operating. The rotor 10 is coaxial with the stator 6 and mounted for rotation about the stator 6. The stator 6 includes openings forming the hollow portions 11 between radiating arms 13 to reduce its weight. The assembly is also provided with a converting system 12 for converting an input electrical current to a variable AC electrical current. The converting system 12 includes a microprocessor unit 44, a DC/AC converter having power electronics 14 fixedly mounted within the hollow portions 11, input terminals 15 for receiving the input electrical current brought by means of the conductors 4 and output terminals 16 for delivering the variable AC electrical current. It has to be understood that the converting system can be reversible, in such a way that the assembly can be used as a generator. The frequency of the variable AC current relates to the desired rotation speed of the rotor 10, the phase angle of the variable AC current determines whether the assembly will operate as a motor or as a generator, and the amplitude of the variable AC current relates to the desired torque.

The user of the present assembly can use relatively low diameter conductors to bring electrical power inside the assembly if such power is produced by a high voltage because the power electronics 14 are inside the assembly. Such power electronics 14 will convert the high voltage low current input signals into a high current signal to supply the variable AC current to the coils 8 of the stator. Because the power electronics 14 are already inside the assembly, the large diameter wires needed to bring the electrical current from the converting system 12 to the coils 8 of the stator will be relatively short. It is understood that the power electronics 14 comprise capacitors, transistors, diodes and other components as is well known in the art.

To reduce the weight or the diameter of the electrical conductors, a high voltage supply can be used in accordance with the relation $P = IV$, where P is power, I is current and V is voltage. If V is increased, then I is reduced. At low speed, power is low. This implies that the current which supplies the converter is low because the voltage is constant. But, if a high torque is needed, the current that supplies the coils of the stator has to be high. The mounting of the power electronics of the converter inside the housing allows for a selection of the electrical supply conductors with respect to a desired motor power while allowing high torque at low speed. Furthermore, the converter allows a matching of the motor impedance with respect to the one of the high voltage supply source.

The stator 6 comprises a central portion attached to the shaft 2, arms 13 extending radially from the central portion, and a peripheral circular pole piece including metallic strips 27 wound with the coils 8. The pole piece is fixed onto peripheral ends of the arms 13.

Figure 25:
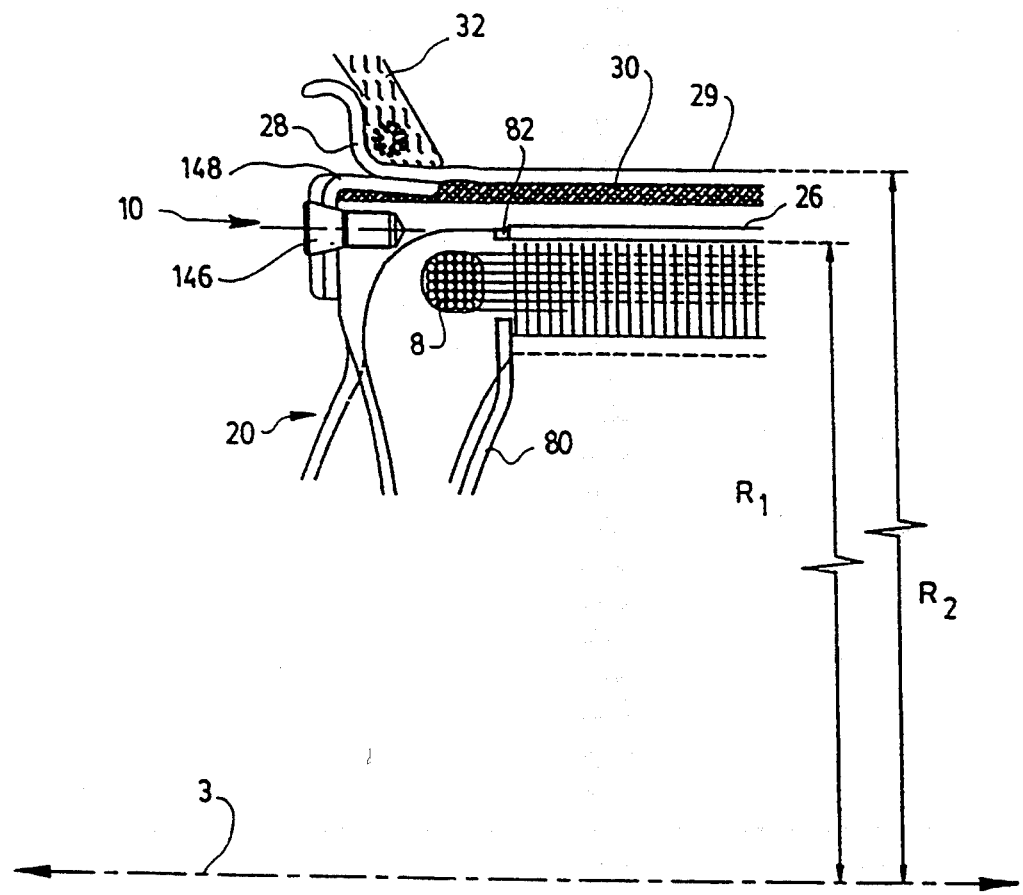
FIG. 25 is an enlarged detail of FIG. 1.

The rotor 10 comprises a housing having a cylindrical wall 17 having inner surface provided with magnetic means 26 surrounding the stator 5 and separate therefrom by an air gap. As the air gap is relatively small, it cannot be seen in these FIGS. 1 and 2 but its location is indicated in FIG. 25 by means of $R_1$. The housing comprises an inner wall 18 on one side of the cylindrical wall 17, and another wall 20 on the other side of the cylindrical wall 17. The shaft 2 extends through the inner wall 18 and centrally thereof.

The housing integral with the rotor 10 sealingly encloses the shaft 2, the stator 6 and the converting system 12. An airtight joint 123 is provided. The assembly comprises a first bearing 22 associated with the inner wall 18, and a second bearing 24 associated with the outer wall 20. The bearings 22 and 24 are respectively mounted on both sides of the shaft 2 so that the rotor 10 can be rotated with respect to the stator 6 by means of the bearings 22 and 24. A threaded bolt 23 is provided for fixing the stator 6 with respect to the shaft 2. A stop ring 21 is also provided. A compressed ring 127 is provided for fixing the bearing 22.

The stator 6 requires at least two arms between the openings to support the pole piece of the stator 6. Also, the support can comprise three equally spaced arms extending radially to the peripheral ends of the stator 6. In FIG. 2, it can be seen that the stator 6 comprises four equally spaced arms 13. In the embodiment shown in these FIGS. 1 and 2, the magnetic means of the rotor 10 includes a series of permanent magnets 26. In FIG. 2, only some magnets are identified by the number 26 but it has to be understood these magnets 26 are provided all around the stator 6. The stator 6 is partially made of a light weight heat conductive material. Preferably, this material is an aluminum alloy. The assembly further comprises a rim 28 fixed around an outer surface of the housing, and a layer 30 made of elastomer and mounted between the rim 28 and the housing. The rim 28 is adapted to receive the tire 32. The rim 28 is flat. The magnets 26 are made preferably of neodymium, iron and boron. The layer 30 prevents penetration of water or dust between the housing and the rim 28 and consequently reduces corrosion thereof.

The peripheral ends of the arms 13 are fixed onto the pole piece of the stator 6 by means of a circular member 34 which is integral with the peripheral ends of the arms 13. The circular member 34 has its outer surface provided with recesses 36. The circular pole piece of the stator 6 has an inner surface provided with projecting tongues 37 of complementary shape that can be fitted into the recesses 36 for fixing the pole piece of the stator 6 onto the circular member 34. The circular member 34 has an inner surface provided with projections 38, whereby an efficient heat exchange can be obtained by means of the projections 38 when an air circulation is produced inside the housing. Only a few projections are indicated by the number 38 to not overload FIG. 2. The support of the stator 6 and the circular member 34 are made of an aluminium alloy whereas the pole piece of the stator 6 is made of steel.

It has to be noted that the ends of the cross formed by the arms 13 of the stator 6 are aligned with the recesses 36 for mechanical reasons. Also, the projections 38 that are disposed along said circular member 34 are in respect of their longitudinal dimension preferably offset with respect to the axis of the shaft of the motorized wheel assembly, along the circumferential direction of the member 34 to mechanically strengthen it.

Referring now to FIGS. 1, 2 and 25, the air gap is positioned at a predetermined distance $R_1$ from the central axis 3 of the shaft 2. The rim 28 has a surface 29 for receiving the tire 32 that is positioned at a predetermined distance $R_2$ from the central axis 3 of the shaft 2, $R_1/R_2$ should be substantially between 0.65 and 0.91 to have an efficient assembly. The higher the ratio $R_1/R_2$ is, the better the efficiency of the assembly is. But, as there is physical limitation, the assembly shown in FIGS. 1, 2 and 25 has substantially a ratio $R_1/R_2$ of 0.91.

For a motor with a radial air-gap, torque T is proportional to $L \cdot R_1^2 \cdot I_S$, where L is pole width, $R_1$ is radius of air gap and $I_S$ is coil current. In designing the present assembly, the width L of the pole piece has been maximized. By having many poles, the weight of the polar piece of the magnetic circuit can be reduced to consequently reduce the weight of the rotor and the inertia moment of the rotor, and to allow a cavity for mounting a brake means. The present assembly increases the torque T by a wide polar piece and by a high ratio of $R_1/R_2$ where the theoretical limit that cannot be reached is 1. The present assembly also provides a high power because $P = T \cdot \omega$ which is proportional to $L \cdot R_1^2 \cdot I \cdot \omega$, where $\omega$ is the angular frequency of the rotor. The present assembly comprises a cross-shaped stator to reduce weight of the assembly, to allow cooling of the coils, and to allow space in hollow portions 11 for mounting the converting system. The cross-shaped stator supports the converting system and is used as a heat sink.

The assembly has preferably thirty two poles. This assembly can also operate with sixteen poles, but it is preferable to have as many poles as possible to reduce the weight of the assembly. The conductors 4 are preferably made of a coaxial cable incorporating an optical fiber. The coaxial cable prevents emission of radiation.

Please note that in the following description, the same reference numbers are referring to similar elements throughout the drawings.

Figure 18:
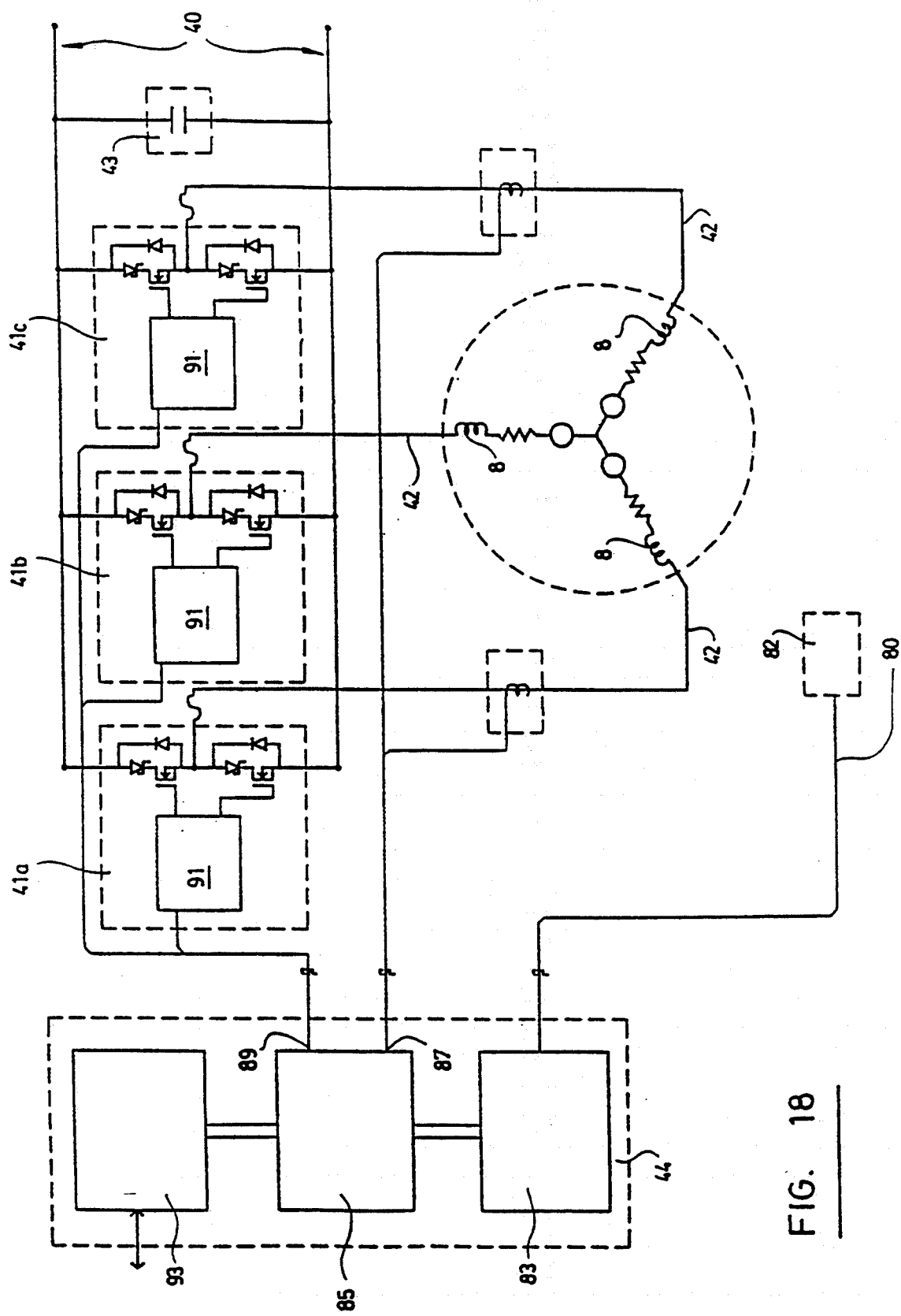
FIG. 18 is a schematic block diagram of an electrical converting system in accordance with the present invention.

Referring now to FIGS. 1, 2 and 18, the converting system comprises a DC/AC converter having an input 40 for receiving a direct current from the input terminals, and three outputs 42 for generating three phase AC currents into the output terminals 16. The AC currents are not necessarily three phase currents, different polyphase currents can be used. The converting system also comprises a microprocessor unit 44 connected to the converter arms 41a, 41b and 41c for controlling operation thereof, which microprocessor unit can be located outside of the motor wheel assembly. The converting system shown in FIG. 18 can be used when the rotor has not to be supplied with an electrical current. As it can be seen in FIG. 2, the stator 6 is cross-shaped and has four arms 13. The converter includes three converter arms 41a, 41b and 41c that generate respectively the three phase AC currents, the arms 41a, 41b and 41c being fixed respectively to three of the four arms 13 of the stator 6. These three converter arms 41a, 41b and 41c are parts of the power electronics 14 shown on FIG. 2. The power electronics 14 shown on FIG. 2 comprise the converter arms 41a, 41b and 41c shown on FIG. 18 but also comprise the capacitor 43 shown on FIG. 18. In this FIG. 18, only one capacitor 43 is shown to simplify the FIG. 18 but in the embodiment shown in FIG. 2, the capacitor 43 is distributed in three capacitors disposed respectively on three of the four arms 13 shown in FIG. 2. It is not essential that the command amplifiers 91 be inside the housing. Each of the converter arms 41a, 41b and 41c comprises a switching section and a command section which is the command amplifier 91. The microprocessor unit 44 is fixed onto the fourth arm. It should be noted that the microprocessor unit 44 can be also mounted outside of the assembly because it does not generate a high current. The assembly further comprises two circular supply distribution bus 48 connected to the converter arms 41a, 41b and 41c, and the microprocessor unit 44, whereby the direct current brought by the conductors can be distributed to the converter arms 41a, 41b and 41c, and the microprocessor unit 44, by means of the bus 48. Please note that the converter can be an AC/AC converter where a high voltage AC electrical current is brought by the conductors.

Referring now to FIGS. 1, 12, 13, 14 and 15, it can be seen that the shaft 2 is provided with a connecting means at its first end by which the assembly can be connected to a supporting member. This supporting member is a knuckle-jointed connecting rod 50. This connecting means is made of an annular member 52 having its outer edge regularly provided with recesses 54 alternating with projections 56 so that the annular member 52 can be engaged and locked with a complementary part 53 of the knuckle-jointed connecting rod 50.

The projections 56 of the outer edge have width which varies in the circumferential direction. The complementary part of the knuckle-jointed connecting rod 50 has also an annular section 58 having a sufficient diameter so that the annular section 58 can be slid over the outer edge of the shaft 2. The annular section 58 has recesses 60 and projections 62 of complementary shape adapted to cooperate with the corresponding projections 56 and recesses 54 of the outer edge of annular member 52. The projections 62 of the annular section 58 have width which varies in the circumferential direction so that the annular section 58 can be slid over the outer edge and rotated with respect with the outer edge to be wedged in an assembled position. Also, there is provided a key member 66 having tongues 68 that can be inserted into cavities 55 that are produced when the annular section 58 is rotated with respect to the outer edge of the shaft 2 to lock the shaft 2 with respect to the knuckled-jointed connecting rod 50. Holes 63 are provided for fixing a disk brake (shown in FIGS. 16 and 17).

The knuckled-jointed connecting rod 50 is provided with an inner elongated slot 70 having a first and adjacent to the annular section 58, and a second end adjacent to the other extremity of the rod 50 whereby the conductors 4 can be brought to the shaft 2 along the elongated slot 70. The key member 66 has an elongated section 72 provided with an inner elongated recess, the elongated section 72 cooperating with the inner slot 70 of the rod 50 along a portion of its length to protect the conductors 4. The portion of the slot 70 that is not protected by the elongated section 72, is provided with a protective element (not shown) to cover the conductors 4. It has to be noted that the inferior edge of the tongues 68 is slightly biased to allow easy penetration and locking of the tongues 68 in the cavities 55. Holes 65 are provided for fixing the key member 66 onto the shaft 2. Threaded holes 67 are provided for making easy removing of the key member 66.

Figure 15:
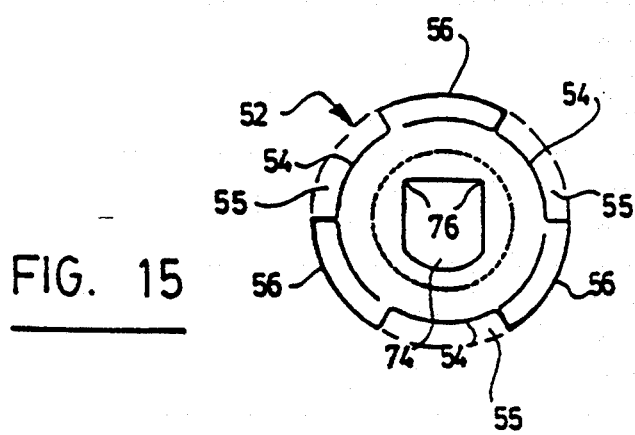
FIG. 15 is a rear view of an element of FIG. 1 onto which the knuckle-jointed connecting rod is connected.

Referring now more specifically to FIG. 15, the first end of the shaft has an inner portion provided with a cavity 74 having sharp edges 76 in the form of square corners so that it can receive a key (not shown in the figures) for rotating the shaft 2.

Referring now more specifically to FIGS. 1, 18 and 25, a measuring means for measuring rotation speed and position of the rotor 10 with respect to the stator 6 comprises an optical fibre 80 having a first end connected to the microprocessor unit 44, and a second end positioned to be adjacent to the rotor 10. The measuring means also comprises a circular light reflector 82 mounted onto the rotor 10 in such a manner that when the rotor 10 is rotating, the reflector passes in front of the second end of the fibre 80, whereby the rotation speed and position of the rotor 10 with respect to the stator 6 can be calculated by means of the microprocessor unit 44. Please note that the circular reflector 82 is made of a series of reflectors having different reflecting characteristics so that position of the rotor 10 with respect to the stator 6 can be determined at any time. The optical fiber 80 comprises at least one fiber.

Referring now more specifically to FIG. 18, the optical fibre 80 and the reflector 82 form an encoder which is connected to a position decoder 83 of the microprocessor unit 44. The position decoder 83 comprises an optical coupler, a light source, a photodetector and other electronic components. The microprocessor unit 44 also comprises a controller 85 having an input 87 for detecting current in the coils 8 of the stator, and an output 89 for triggering said converter arms 41a, 41b and 41c by means of command amplifiers 91. The microprocessor unit 44 is also provided with a communication interface 93 for linking it with another computer device. It is not essential that the command amplifiers 91 be inside the housing.

Figure 16:
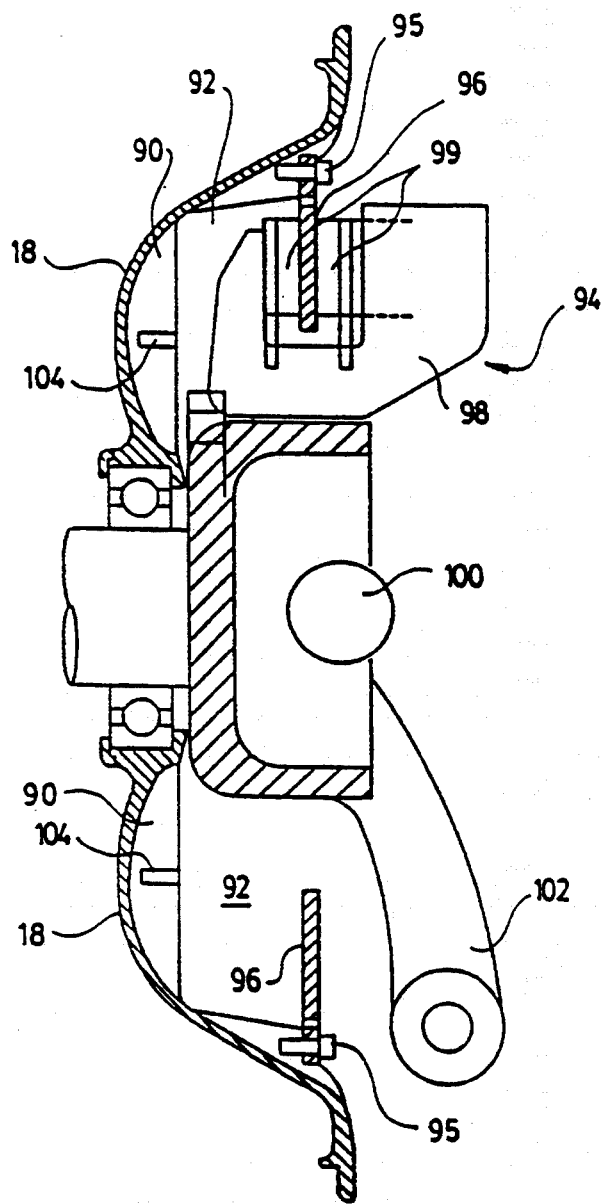
FIG. 16 is a view from above partially in cross-section of the rear part of the motorized wheel assembly shown in FIG. 1.
Figure 17:
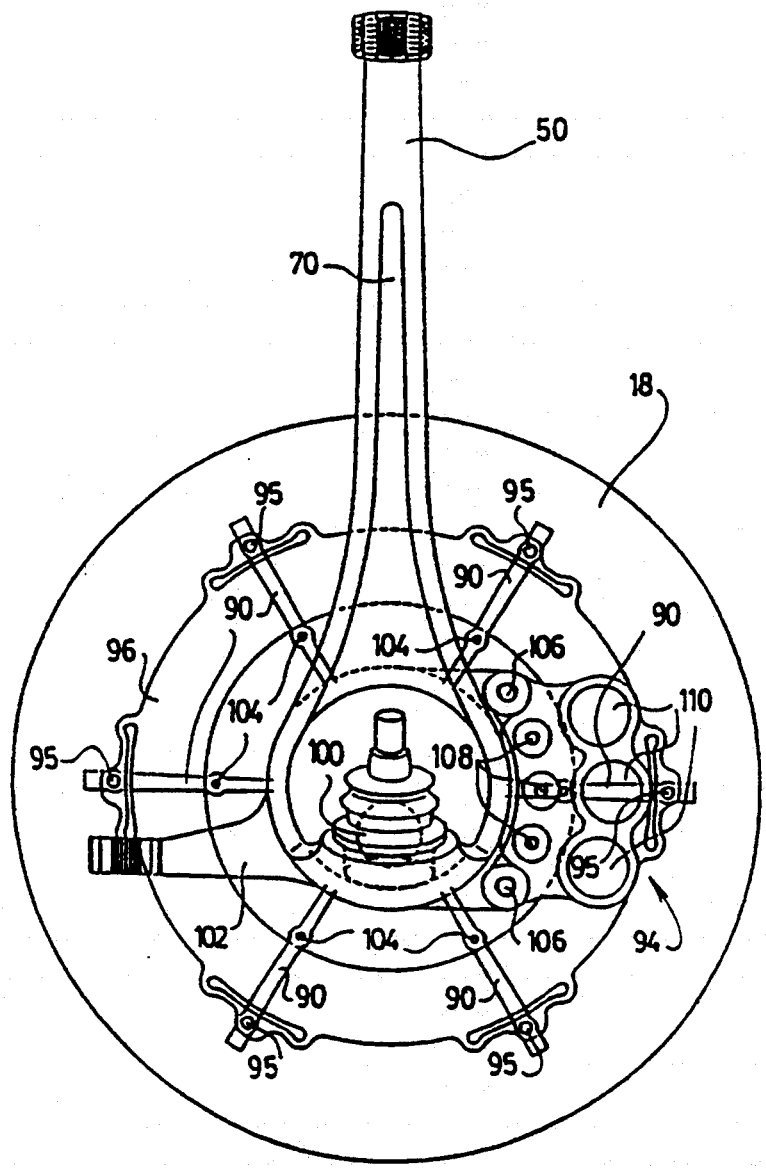
FIG. 17 is a rear view of the knuckle-jointed connecting rod in combination with a disk-brake.

Referring now to FIGS. 1, 16 and 17, it can be seen that the inner wall 18 of the housing has a concave-shaped outer surface to produce, when the rotor 10 is rotating, an air circulation toward periphery of the inner wall 18. The outer surface is provided with a series of parallel elongated strips 90 extending in the direction of the shaft 2. The strips have their free side defining the space 92 in which brake means 94 can be mounted, whereby an efficient heat exchange can be obtained through the inner wall 18 and the brake means 94 can be cooled down by the air circulation produced along the inner wall 18.

Referring now more specifically to FIGS. 16 and 17, there is shown that the brake means 94 is a disk brake having its disk 96 bolted onto the inner wall 18. As it is known in the art, this disk brake comprises a caliper 98 adapted to cooperate with the disk 96. Shown in a schematic manner, there is the ball joint 100 and the steering arm 102 of the steering system. Each of the strips 90 is provided with a threaded cavity 104 for mounting a drum brake instead of the disk brake 94. Bolts 95 are provided for fixing the disk 96 onto the inner wall 18.

There is shown the fasteners 106 for fixing the disk brake assembly 94 onto the rod 50. There are also shown the bolts 108 to support the caliper, and the pistons 110 for activating pads 99. From FIGS. 1, 16 and 17 it can be seen that the ball joint of the steering system is quite close to the shaft 2 so that the angle α between the rotation axis of the motor-wheel and the axis determined by the rod 50 and the ball-joint 100 is advantageous. It should be noted that the geometry of the inner wall 18 allows an advantageous position of the ball joint 100 with respect to the motor-wheel assembly.

Figure 6:
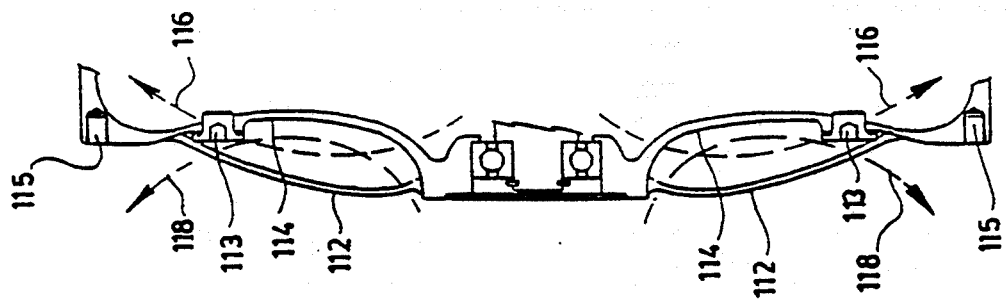
FIG. 6 is an enlarged detail of FIG. 1.
Figure 5:
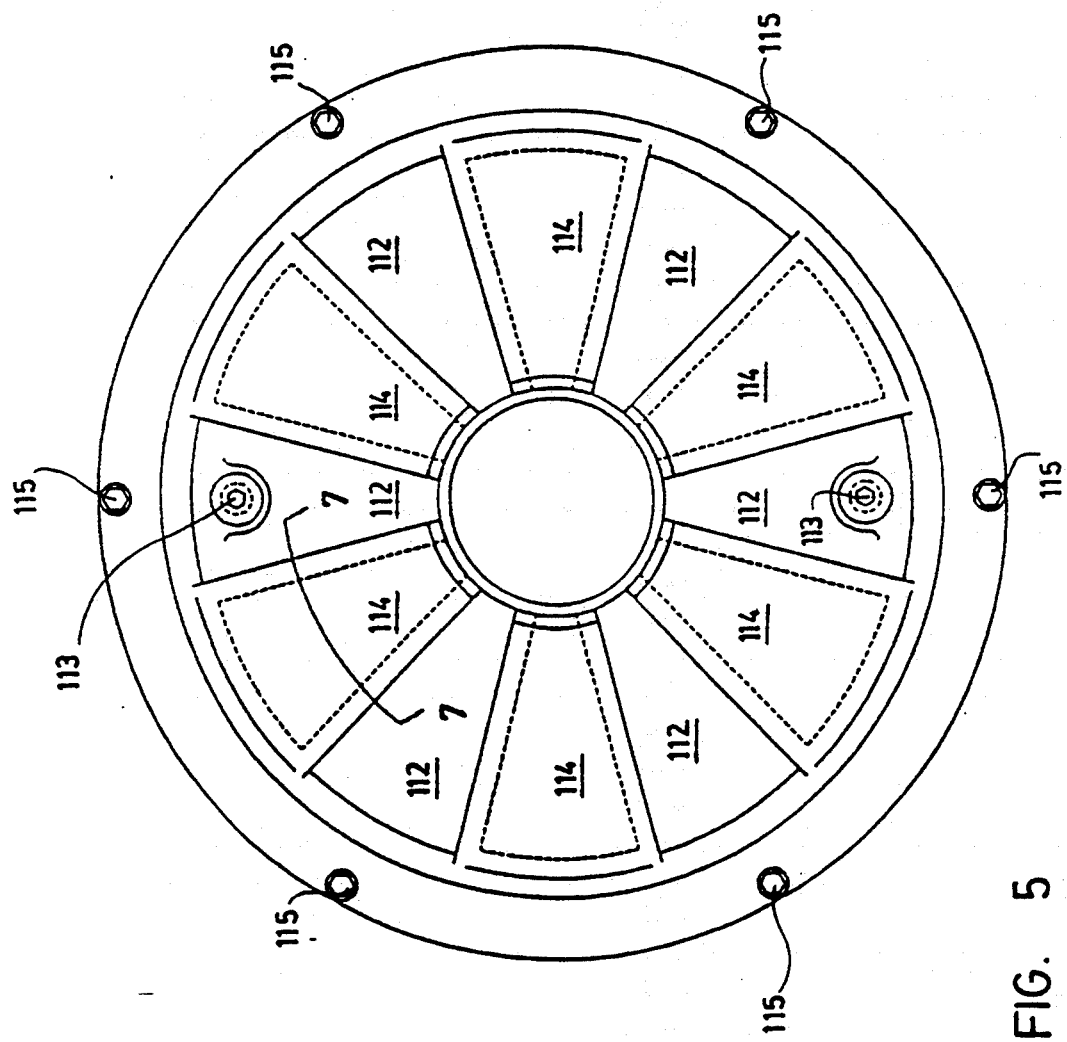
FIG. 5 is a front view of a portion of the motorized wheel assembly shown in FIG. 1.
Figure 9:
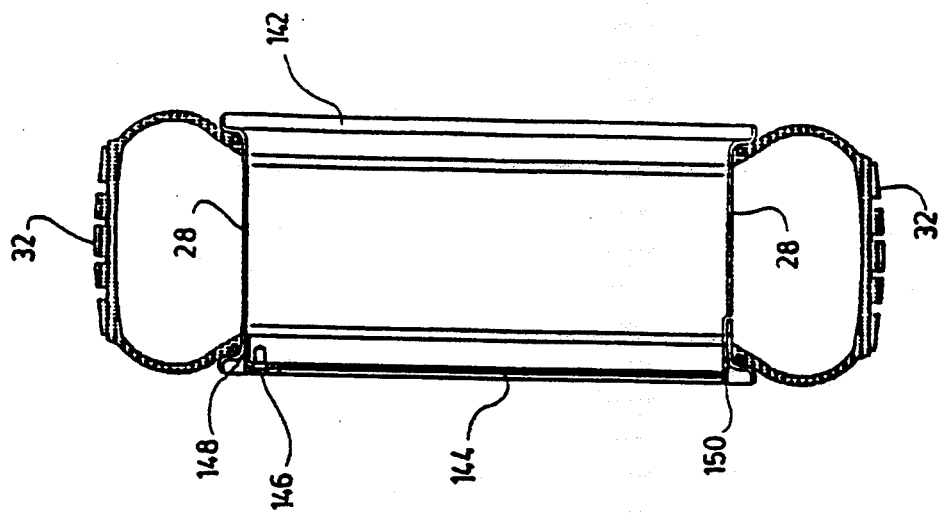
FIG. 9 is a cross-section view along line 9—9 of FIG. 8.
Figure 8:
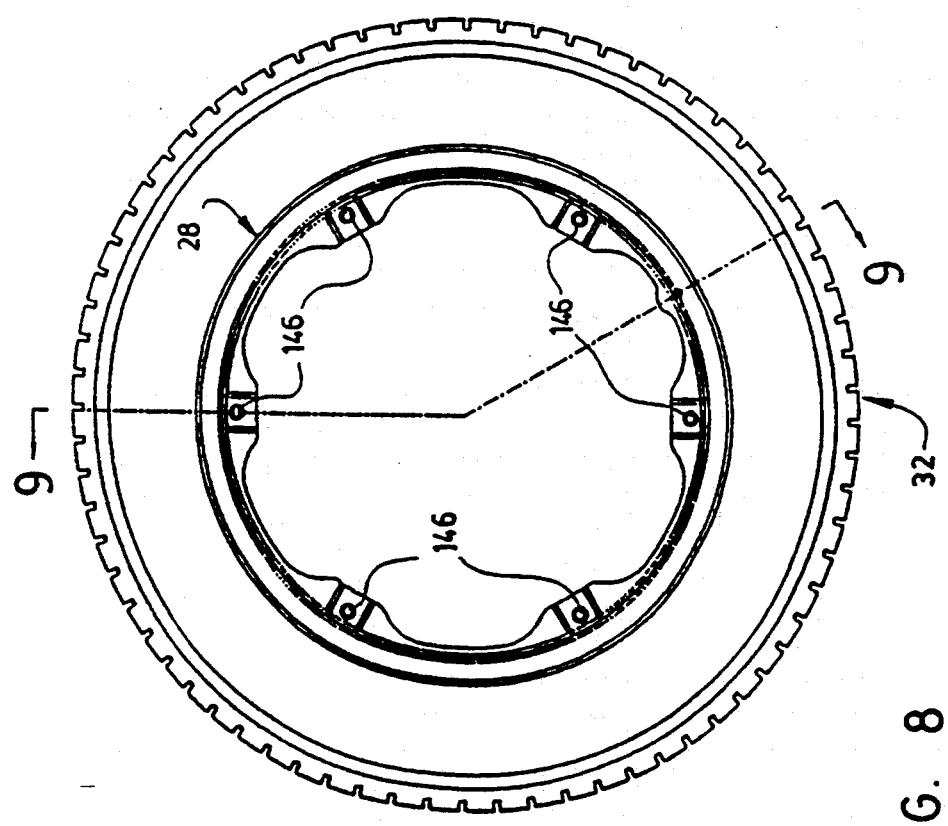
FIG. 8 is a front view of the rim with the tire shown in FIG. 1.
Figure 7:
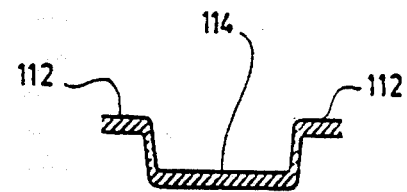
FIG. 7 is a cross-section view along line 7—7 of FIG. 5.
Figure 10:
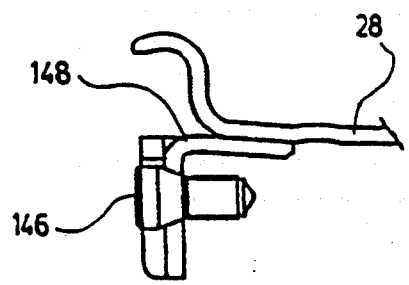
FIG. 10 is an enlarged detail of FIG. 9.
Figure 11:
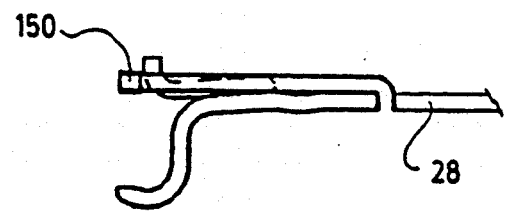
FIG. 11 is an enlarged detail of FIG. 9.
Figure 12:
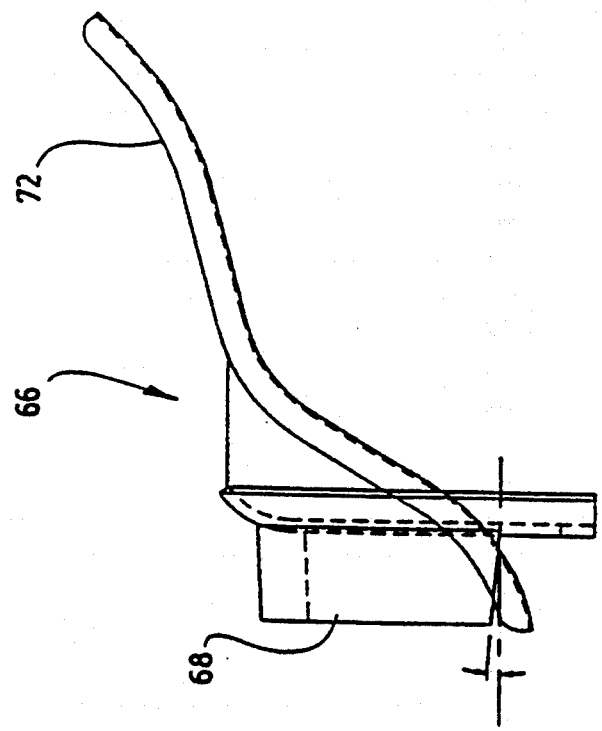
FIG. 12 is an enlarged detail of FIG. 1.
Figure 13:
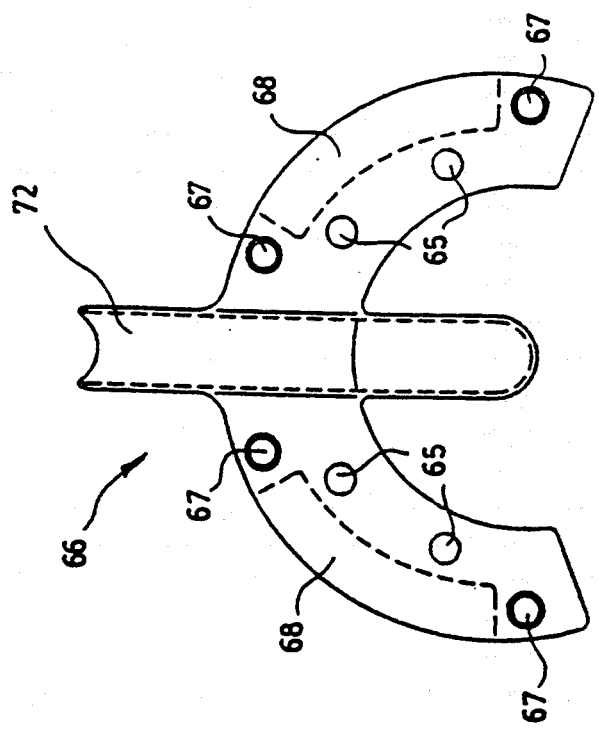
FIG. 13 is a rear view of the elements shown on FIG. 12.
Figure 14:
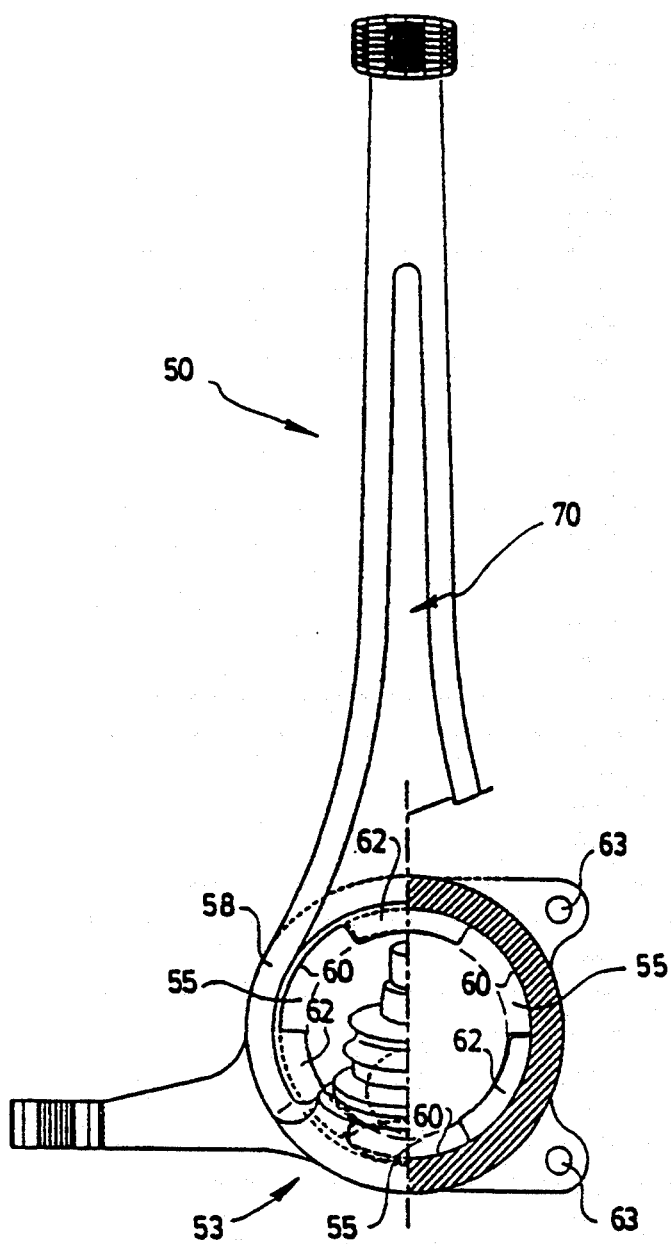
FIG. 14 is a rear view of the knuckle-jointed connecting rod shown on FIG. 1, partially in cross-section.

Referring now to FIGS. 1, 5, 6 and 7, the outer wall of the housing comprises convex and concave sections 112 and 114 that alternate along circumference direction thereof, in such a manner that, when the rotor 10 is rotating, an air circulation is produced inside the housing by means of the convex section 112 as indicated by the arrows 116, and an air circulation is produced along outside portions of the concave section 114 as indicated by the arrows 118 whereby an efficient heat exchange can be obtained through the outer wall. It should be noted that FIG. 6 is a side view partially in cross-section of FIG. 5. Apertures with caps 113 are provided to have an access inside the housing. Bolts 115 are provided for fixing the rim 28.

Figure 4:
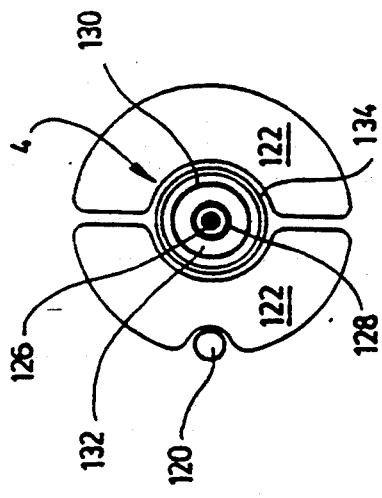
FIG. 4 is a view along line 4—4 of FIG. 3.
Figure 3:
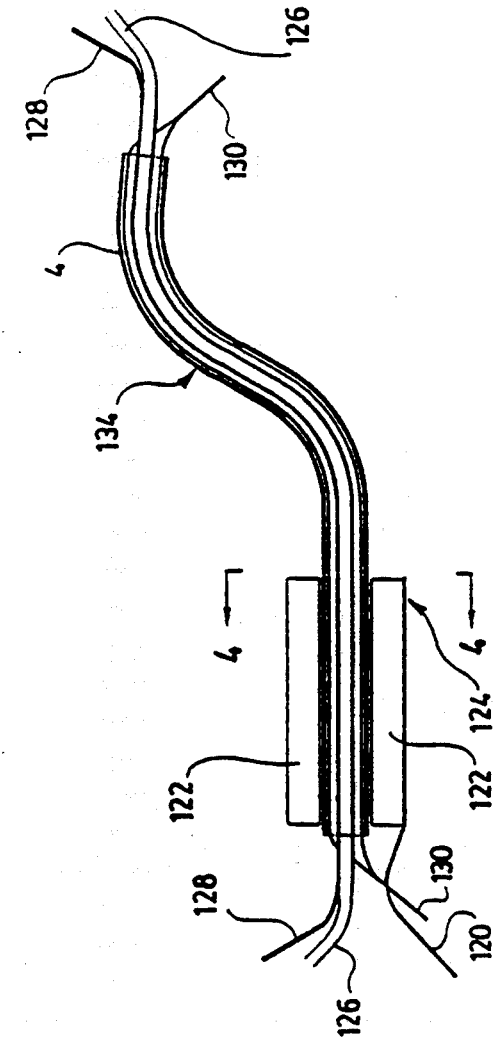
FIG. 3 is an enlarged detail of FIG. 1.

Referring now to FIGS. 1, 3 and 4, the assembly further comprises drying means including an air pipe 120 having an end disposed inside the housing, a chamber 122 disposed at the outer end of the pipe 120 and a desiccating material (not shown) disposed inside the chamber 122 whereby, when the rotor 10 is rotating, air circulation is produced inside the pipe 120 and through the chamber 122 to dry air inside the housing. The chamber 122 is annular, elongated and disposed inside the hollow shaft 2. The chamber 122 is opened at both of its ends. The opening of the shaft that is adjacent to the knuckle-jointed connecting rod 50 is air tight. As it can be seen in FIG. 1, one end of the pipe 120 is adjacent to the peripheral portion of the stator 6, the pipe 120 is mounted between the outer wall 20 and the stator 6 till it reaches an opening in the shaft 2, then it is disposed along the chamber 122 with its other end 124 disposed at the end of the chamber as shown in FIGS. 3 and 4. The end 124 of the pipe 120 is disposed between the air tight opening of the hollow shaft and the chamber 122 so that the air circulating through the pipe 120 has to go through the chamber 122 where it is dried.

The conductors 4 comprise at its centre, an optical fibre 126, a first electrical conductor 128 and a second electrical conductor 130 separated from the first conductor by an isolating material 132. The conductors 4 are protected by an outer sheath 134.

Referring now to FIGS. 8, 9, 10 and 11, there is shown a tire 32 that is fixed to the rim 28 in a permanent manner during the manufacturing of the assembly. The assembly is provided with a flat rim 28, a first side flange 142 that is welded onto the rim 28, and a second side flange 144 that is fixed onto the rim 28 by means of bolts 146 and L-shaped members 148 welded onto the rim 28. The relation between the rim 28, the bolts 146 and the L-shaped members 148 can be seen more easily on FIG. 10. The tire 32 can be inflated by means of a valve 150 which provides an access inside the tire 32. This valve 150 can be seen with more details in FIG. 11.

As the rim 2M is flat, the tire 32 cannot be removed from the rim 28. With such motor-wheel assembly, when the tire is worn out, the rim 28 with the tire 32 has to be replaced.

Figure 19:
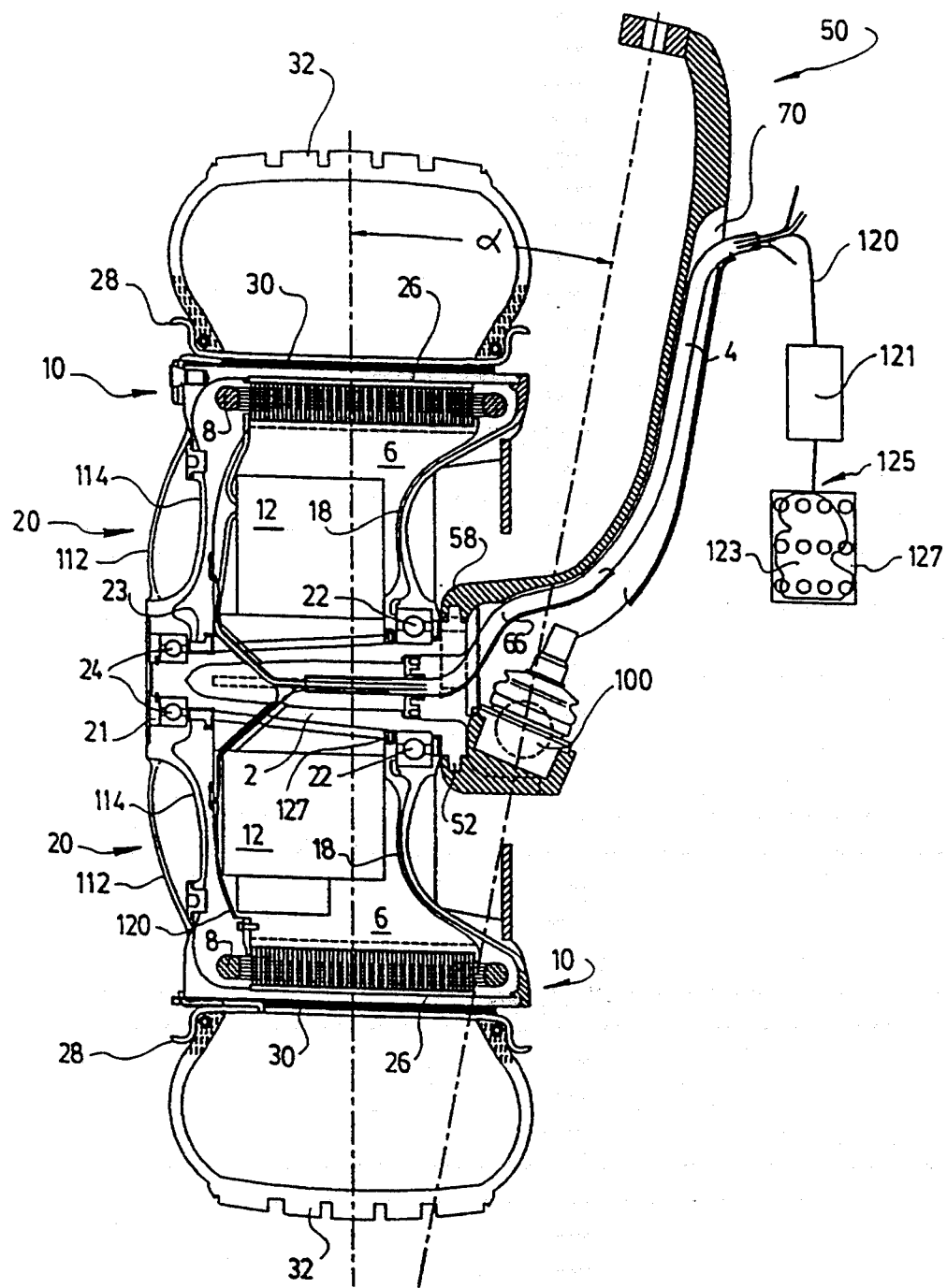
FIG. 19 is a side elevational view partially in cross-section of another embodiment of the motorized wheel assembly in accordance with the present invention.

Referring now to FIG. 19, there is shown an assembly similar to the one shown on FIG. 1, wherein the drying means is different. This drying means include air pipe 120 having an end disposed inside the housing, and a chamber 121 with an inflatable balloon 123 mounted in a casing 127, disposed at the other end 125 of the pipe 120. A desiccating material is disposed inside the chamber 121 whereby when temperature or atmospheric pressure changes, air circulation is produced inside the pipe 120 and through the chamber 121 to dry air inside the housing. As it can be seen, the chamber 121 is disposed outside of the assembly, The opening of the shaft 2 that is adjacent to the knuckle-jointed connecting rod 50 is air-tight. The pipe 120 is used as an outlet from and an inlet into the chamber 121.

Figure 20:
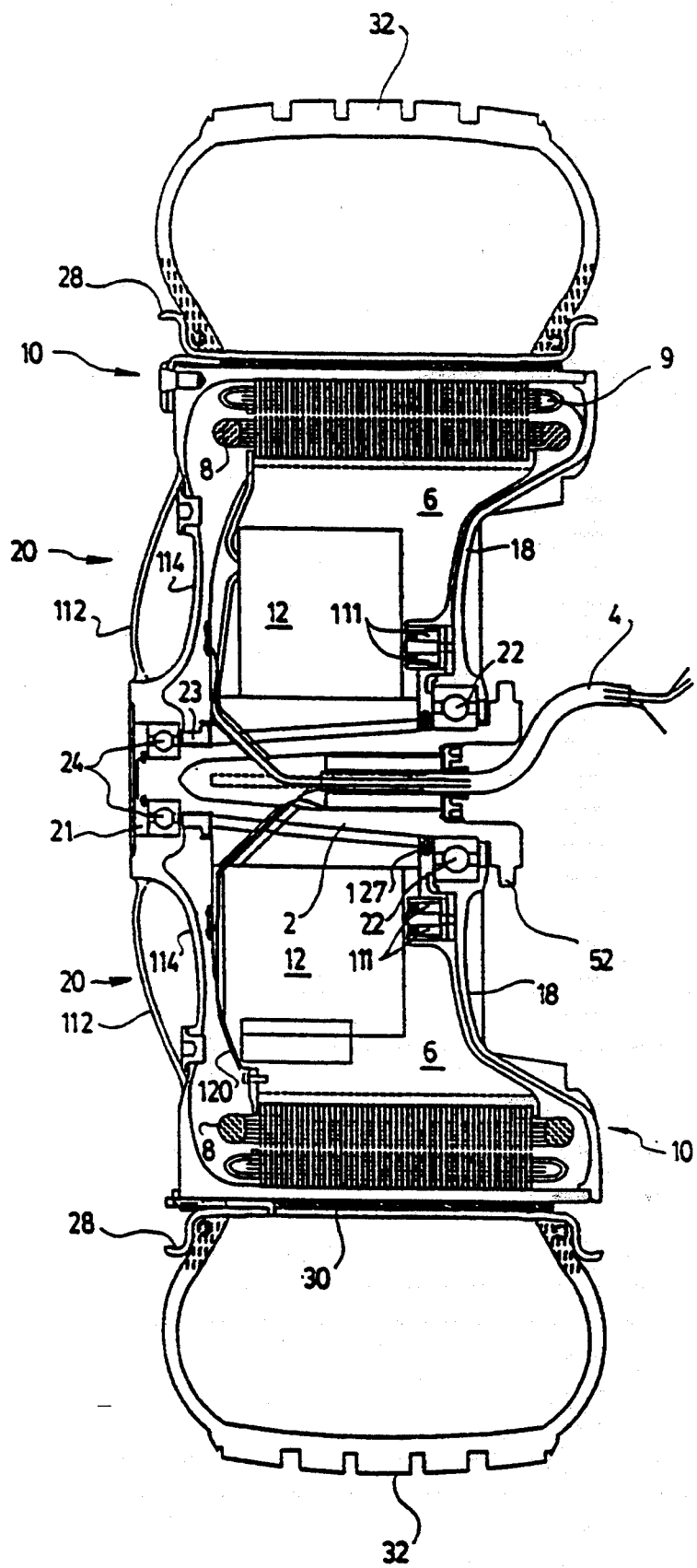
FIG. 20 is a side elevational view partially in cross-section of another embodiment of the motorized wheel assembly in accordance with the present invention.

Referring now to FIG. 20, there is shown an electrically motorized wheel assembly wherein the rotor comprises magnetic means including a pole piece made of metallic strips wound with a coil 9, the stator is provided with brushes 111 that are connected to an output of the converting system 12. The rotor is provided with conductive contact surface disposed in a manner to cooperate with the brushes 111. The contact surface is connected to the coil 9 of the rotor 10.

Figure 21:
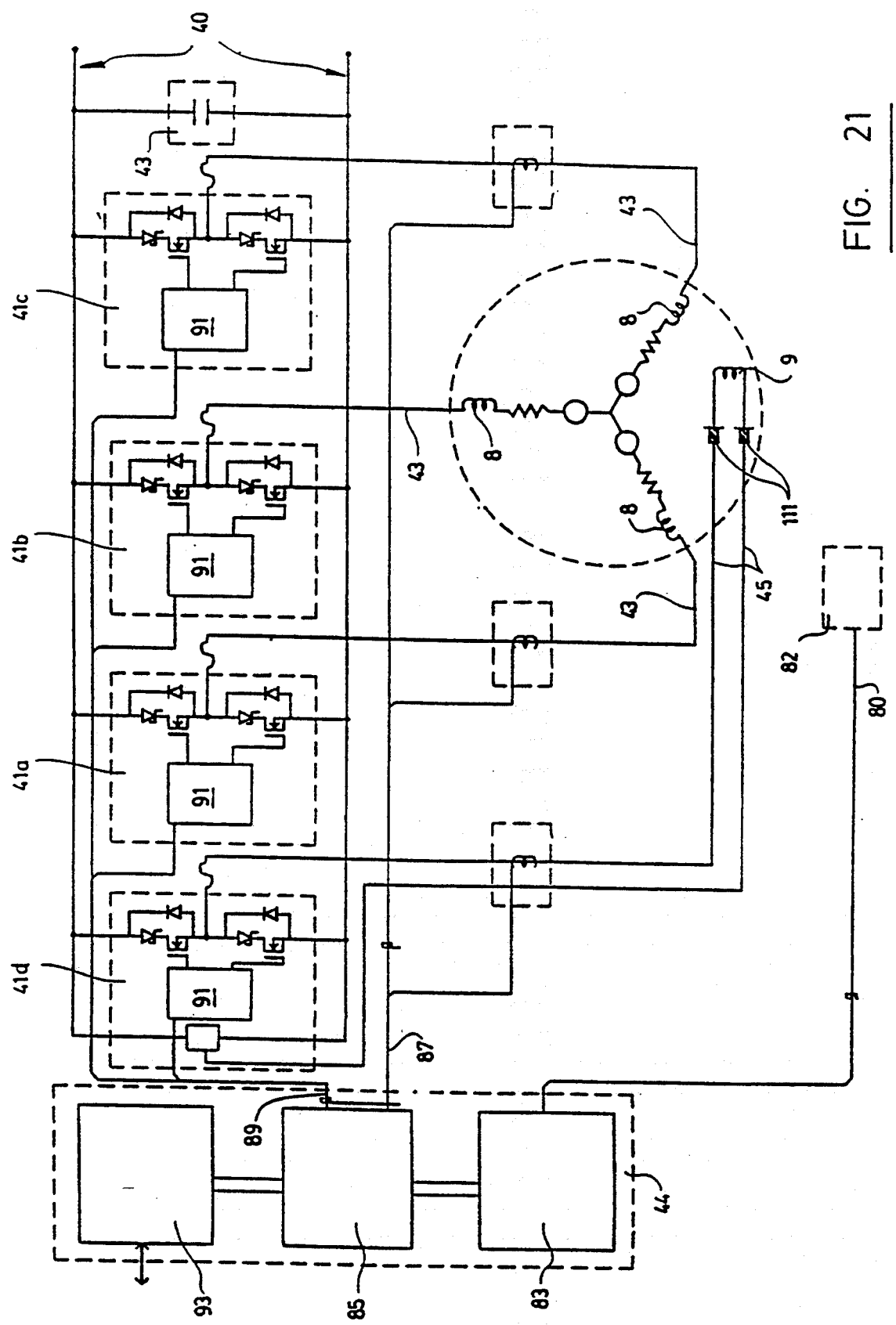
FIG. 21 is a schematic block diagram of another embodiment of the electrical converting means in accordance with the present invention.

Referring now more specifically to FIGS. 20 and 21, the converting system 12 comprises a DC/AC converter having four converter aims 41a, 41b, 41c and 41d, an input for receiving a direct current from input terminals 40, and four outputs 45 and 43 for generating a DC current for coil 9 of the rotor 10 and three phase AC currents for coils 8 of the stator 6. The converting system also comprises a microprocessor unit 44 connected to the converter arms 41a, 41b, 41c and 41d for controlling operation thereof. The coil 9 and the strips of the rotor 10 onto which the coil 9 is wound can be replaced by a conductive ring.

Figure 22:
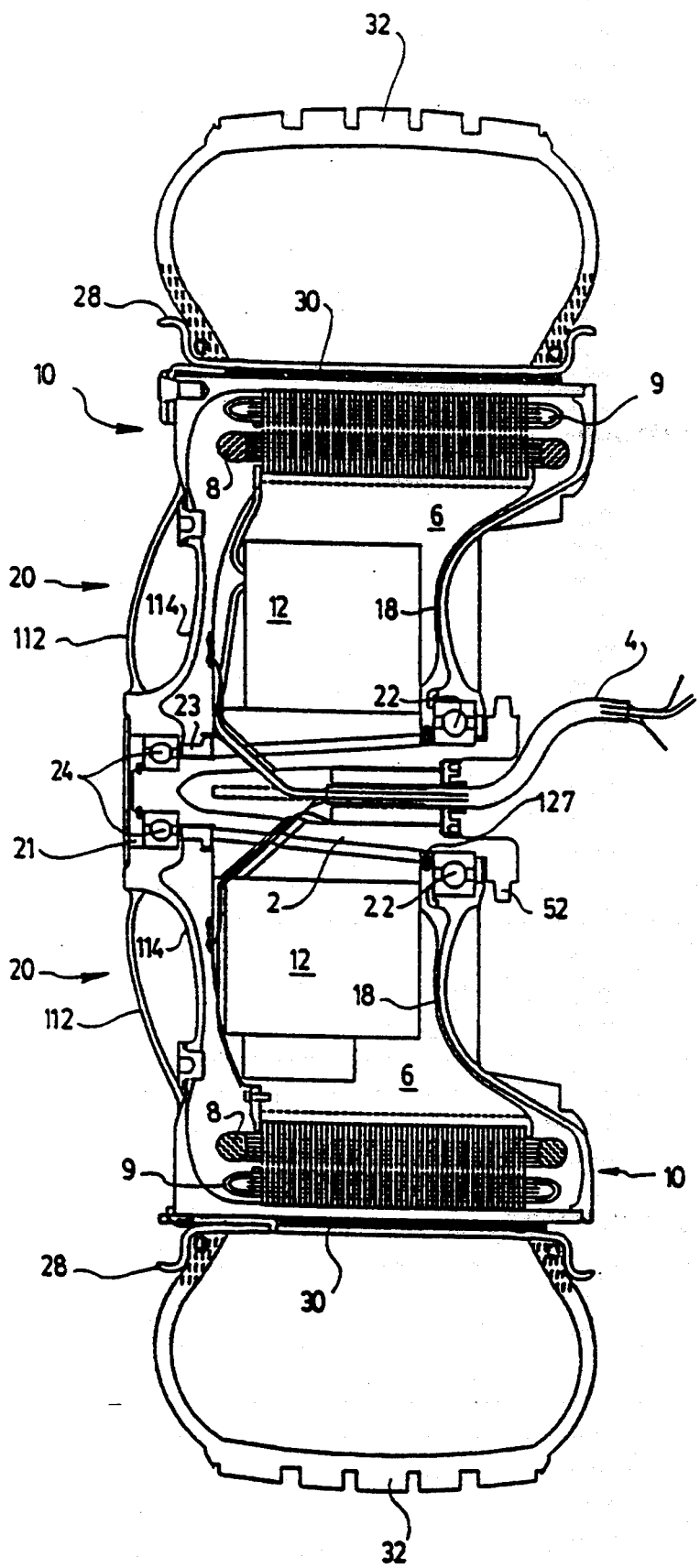
FIG. 22 is a side elevational view partially in cross-section of another embodiment of the motorized wheel assembly in accordance with the present invention.
Figure 23:
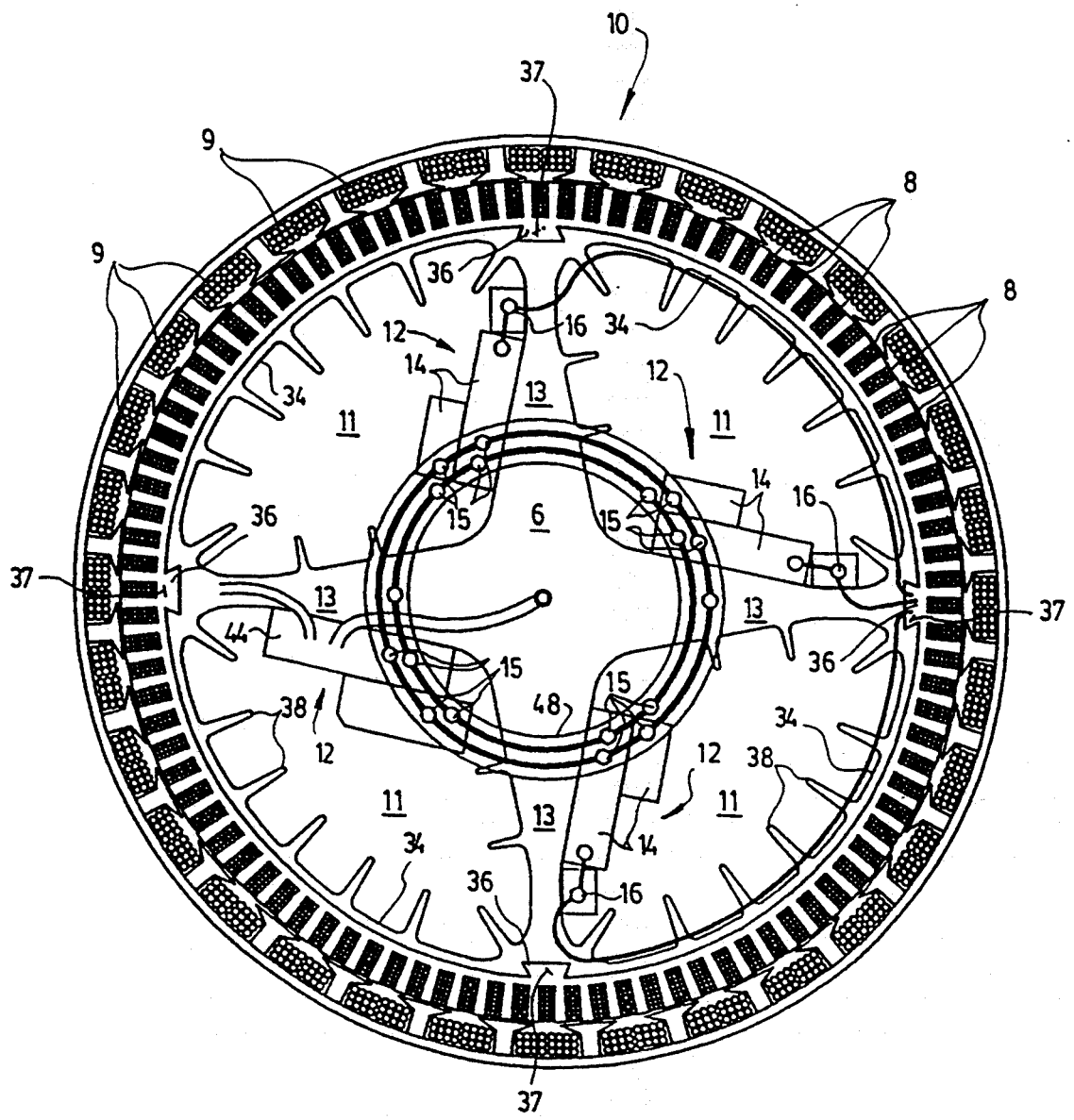
FIG. 23 is a front view partially in cross-section of the stator and rotor the motorized wheel assembly shown in FIG. 22.

Referring now to FIGS. 22 and 23, there is shown a motorized wheel assembly incorporating an induction rotor. The rotor comprises a magnetic means including a pole piece made of metallic strips wound with a coil 9, whereby electrical current can be induced in the coil 9 of the rotor by means of an electromagnetic field produced by electrical current injected to the coils 0 of the stator 6. The reference number 8, in FIG. 23, is meant to represent all the coils disposed around the stator even if only one portion of the coils is indicated. Also, reference number 9, in FIG. 23 is meant to represent the coil that is disposed all around the rotor. The converting system 12 comprises a DC/AC converter having three converter arms 41a, 41b and 41c, an input for receiving a direct current from the input terminals 15 that are connected to the bus 48 and three outputs generating three phase AC currents into the output terminals 16. Also, the converting system 12 comprises a microprocessor unit 44 connected to the converter for controlling its operation.

As it can be seen in FIG. 23, the stator 6 is cross-shaped and has four arms 13. The converter comprises power electronics 14 which are made in parts of three converter arms that generate respectively the three phase AC currents. The converter arms are fixed respectively onto three of the four arms 13. The assembly further comprises two circular supply distribution bus 48 connected to the power electronics 14 and microprocessor unit 44.

The air gap is positioned at a predetermined distance $R_1$ from the central axis 3 of the shaft 2. The rim 28 has a surface for receiving the tire 32 that is positioned at a predetermined distance $R_2$ from the central axis 3 of the shaft 2. The ratio $R_1/R_2$ is substantially between 0.65 and 0.80 in the case where the rotor is provided with a coil. The higher the ratio is, the better the efficiency of the assembly is. In the case shown in FIGS. 22 and 23, the ratio is substantially 0.80.

Figure 24:
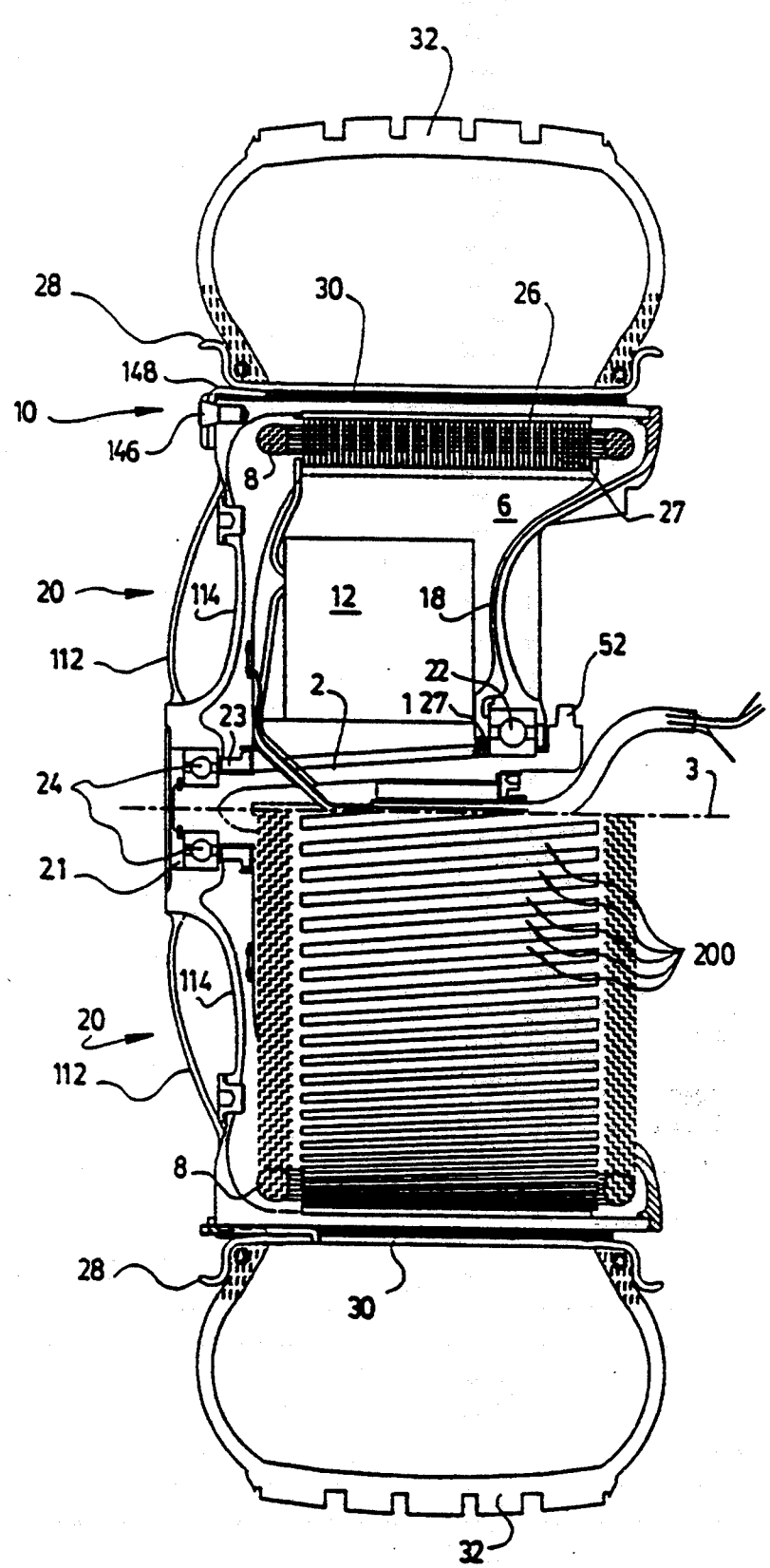
FIG. 24 is another side elevational view, partially in cross-section of the embodiment of the motorized wheel assembly shown in FIG. 1.

Referring now to FIG. 24, there is shown that the stator 6 is cylindrical and provided with longitudinal and parallel slots 200 for receiving the coils 8 or the stator 6. To not overload the FIG. 24, only a few slots have been identified by number 200. The slots are bended with respect to the longitudinal axis 3 of the shaft 2 so that each of the slots 200 has its lower end that is substantially aligned with the upper end of the adjacent slot to provide a regular torque when the assembly is operating.

Although the present invention has been explained hereinabove by way of preferred embodiments thereof, it should be pointed out that any modifications to these preferred embodiments within the scope of the appended claims is not deemed to alter or change the nature of the scope of the present invention.

I claim:

1. An electrically motorized wheel assembly comprising:
   a hollow shaft having a first opening at one end thereof and a second opening, said first opening receiving conductors from outside of said assembly;
   a stator coaxial with and fixedly attached to said shaft, said stator being provided with coils, said stator comprising a central portion attached to said shaft, a support provided with openings and extending radially from said central portion, and a peripheral circular pole piece wound with said coils, said pole piece being fixed onto peripheral ends of said support;
   a rotor coaxial with said stator and mounted for rotation about said stator, said rotor comprising a housing having a cylindrical wall having an inner surface provided with a magnetic means surrounding said stator and separated therefrom by an air-gap, said housing comprising an inner wall, on a side of said cylindrical wall, and an outer wall, on the other side of said cylindrical wall, said shaft extending through said inner wall and centrally thereof, said outer wall of said housing comprising convex and concave sections that alternate along circumference direction thereof, in such a manner that, when said rotor is rotating, an air circulation is produced inside said housing by means of said convex sections, and an air circulation is produced along outside portions of said concave sections, whereby an efficient heat exchange can be obtained through said outer wall; and
   converting means for converting an input electrical current to a variable AC electrical current, said converting means including power electronics, input terminals for receiving said input electrical current and output terminals for delivering said variable AC electrical current to said coils of said stator.

2. An electrically motorized wheel assembly according to claim 1, wherein:
   said stator is provided with a hollow portion; and
   said power electronics are fixedly mounted within said hollow portion.

3. An assembly according to claim 1, wherein said housing sealingly encloses said shaft, said stator and said converting means.

4. An assembly according to claim 1, comprising a first bearing associated with said inner wall, and a second bearing associated with said outer wall, said bearings being respectively mounted on both sides of said shaft so that said rotor can be rotated with respect to said stator by means of said bearings.

5. An assembly according to claim 1, wherein said magnetic means surrounding said stator include a series of permanent magnets.

6. An assembly according to claim 5, wherein said converting means comprises:
   a DC/AC converter having an input for receiving a direct current from said input terminals, and three outputs for generating three phase AC currents into said output terminals; and
   a microprocessor unit connected to said converter for controlling its operation.

7. An assembly according to claim 6, wherein:
   said stator is cross-shaped and has four arms;
   said converter is made of three converter units that generate respectively said three phase AC currents, said units being fixed respectively onto three of said four arms; and
   said microprocessor unit is fixed onto the fourth of said arms;
   said assembly further comprising two circular supply distribution bus connected to said converter and microprocessor units, whereby said direct current can be distributed to said converter and microprocessor units by means of said bus.

8. An assembly according to claim 1, wherein said stator comprises a lightweight heat conductive material.

9. An assembly according to claim 8, wherein said material is aluminum alloy.

10. An assembly according to claim 1, further comprising a rim fixed around an outer surface of said housing, and a layer made of elastomer and mounted between said rim and said housing, said rim being adapted to receive a tire.

11. An assembly according to claim 10, wherein said rim is flat.

12. An assembly according to claim 1, wherein said peripheral circular pole piece includes metallic strips.

13. An assembly according to claim 12, wherein said support comprises at least two arms between said openings.

14. An assembly according to claim 13, wherein said support comprises at least three equally spaced arms extending radially to said peripheral ends of said support.

15. An assembly according to claim 14, wherein said equally spaced arms comprise four equally spaced arms.

16. An assembly according to claim 12, wherein said peripheral ends of said support are fixed onto the pole piece of said stator by means of a circular member that is solid with said peripheral ends, said circular member having an outer surface provided with recesses, said circular pole piece of said stator having an inner surface provided with projecting tongues that can be fitted into said recesses for fixing said pole piece of said stator onto said circular member, said circular member having an inner surface provided with projections, whereby an efficient heat exchange can be obtained by means of said projections when an air circulation is produced inside said housing.

17. An assembly according to claim 1, wherein said inner wall of said housing has a concave-shaped outer surface to produce, when said rotor is rotating, an air circulation toward periphery of said inner wall, said outer surface being provided with a series of parallel elongated strips extending in the direction of said shaft, said strips having their free side defining a space in which brake means can be mounted, whereby an efficient heat exchange can be obtained through said inner wall, and said brake means can be cooled down by the air circulation produced along said inner wall.

18. An assembly according to claim 1, further comprising drying means including an air pipe having an end disposed inside said housing, a chamber disposed at the other end of said pipe, and a desiccating material disposed inside said chamber, whereby, when said rotor is rotating, air circulation is produced inside said pipe and through said chamber to dry air inside said housing.

19. An assembly according to claim 18, wherein:
said chamber is an annular elongated chamber disposed inside said hollow shaft, said chamber being open at both of its ends;
said first opening of said shaft is airtight; and
said other end of said pipe is disposed between said airtight first opening and said chamber.

20. An assembly according to claim 18, wherein;
said chamber is disposed outside of said assembly; and
said first opening of said shaft is airtight; whereby said pipe is used as an outlet from an inlet into said chamber.

* * * * *

UNITED STATES PATENT AND TRADEMARK OFFICE
CERTIFICATE OF CORRECTION

PATENT NO. : 5,438,228
DATED : August 1, 1995
INVENTOR(S) : Couture

It is certified that error appears in the above-indentified patent and that said Letters Patent is hereby corrected as shown below:

On the title page: Item [75] Inventors: delete inventors listed and insert the following:

--Pierre Couture, Boucherville, Canada--

Item [19] listing the inventors delete "et al."

Signed and Sealed this

Thirteenth Day of February, 1996

Attest:

BRUCE LEHMAN

*Attesting Officer*  *Commissioner of Patents and Trademarks*